(12) United States Patent
Zeitzew et al.

(10) Patent No.: US 12,210,107 B2
(45) Date of Patent: Jan. 28, 2025

(54) SATELLITE NAVIGATION RECEIVER FOR RELATIVE POSITIONING WITH BIAS ESTIMATION

(71) Applicant: DEERE & COMPANY, Moline, IL (US)

(72) Inventors: Michael A. Zeitzew, Torrance, CA (US); Liwen L Dai, Torrance, CA (US); Min Wang, Tustin, CA (US); David S. Chiu, Los Angeles, CA (US)

(73) Assignee: Deere & Company, Moline, IL (US)

( * ) Notice: Subject to any disclaimer, the term of this patent is extended or adjusted under 35 U.S.C. 154(b) by 493 days.

(21) Appl. No.: 17/448,387

(22) Filed: Sep. 22, 2021

(65) Prior Publication Data

US 2022/0003879 A1 Jan. 6, 2022

Related U.S. Application Data

(62) Division of application No. 14/857,109, filed on Sep. 17, 2015, now Pat. No. 11,175,414.

(60) Provisional application No. 62/185,987, filed on Jun. 29, 2015.

(51) Int. Cl.
*G01S 19/51* (2010.01)
*G01S 19/29* (2010.01)
*G01S 19/43* (2010.01)

(52) U.S. Cl.
CPC .............. *G01S 19/51* (2013.01); *G01S 19/43* (2013.01); *G01S 19/29* (2013.01)

(58) Field of Classification Search
CPC ........... G01S 19/51; G01S 19/43; G01S 19/29
See application file for complete search history.

(56) References Cited

U.S. PATENT DOCUMENTS

| 5,757,646 A | 5/1998 | Talbot et al. |
| 5,914,685 A | 6/1999 | Kozlov et al. |
| 5,916,300 A | 6/1999 | Kirk et al. |
| 5,999,123 A | 12/1999 | Disselkoen et al. |

(Continued)

FOREIGN PATENT DOCUMENTS

| CN | 102124371 A | 7/2011 |
| EP | 2759849 A1 | 7/2014 |

(Continued)

OTHER PUBLICATIONS

European Examination Report issued in European Patent Application No. 16818482.8, dated Dec. 6, 2021, in 06 pages.

(Continued)

*Primary Examiner* — Cassi J Galt

(57) ABSTRACT

A tracking module processes the determined correlations to track a carrier of the received composite signal for estimation of a change in phase over a time period between a receiver antenna and one or more satellite transmitters that transmit the received signal as the receiver changes position with respect to an initial position during the time period. A relative position estimator estimates the relative position of the navigation receiver with respect to an initial position over the time period time by time-differencing of the phase measurements of the one or more tracked carrier signals. Bias estimators can estimate or compensate for errors in initial position and temporal changes in receiver clock and tropospheric delay.

15 Claims, 9 Drawing Sheets

(56) References Cited

U.S. PATENT DOCUMENTS

| | | |
|---|---|---|
| 6,266,584 B1 | 7/2001 | Hur-Diaz et al. |
| 6,373,432 B1 | 4/2002 | Rabinowitz et al. |
| 6,456,233 B1 | 9/2002 | Zhodzishky et al. |
| 6,810,324 B1 | 10/2004 | Nadkarni |
| 6,943,728 B2 | 9/2005 | Han et al. |
| 6,961,018 B2 | 11/2005 | Heppe et al. |
| 7,071,870 B2 | 7/2006 | Sharpe et al. |
| 7,119,741 B2 | 10/2006 | Sharpe et al. |
| 7,212,155 B2 | 5/2007 | Hatch et al. |
| 7,247,950 B2 | 7/2007 | Fujisawa et al. |
| 7,248,211 B2 | 7/2007 | Hatch et al. |
| 7,298,319 B2 | 11/2007 | Han et al. |
| 7,427,950 B2 | 9/2008 | Eslinger et al. |
| 7,511,661 B2 | 3/2009 | Hatch et al. |
| 7,663,539 B2 | 2/2010 | Han et al. |
| 7,670,555 B2 | 3/2010 | Hoover et al. |
| 7,679,555 B2 | 3/2010 | Dai et al. |
| 7,924,104 B2 | 4/2011 | Huang et al. |
| 7,961,143 B2 | 6/2011 | Dai et al. |
| 8,140,223 B2 | 3/2012 | Whitehead et al. |
| 8,170,796 B2* | 5/2012 | Liu ............... G01S 19/51 |
| | | 701/410 |
| 8,368,590 B2 | 2/2013 | Vollath et al. |
| 8,368,591 B2 | 2/2013 | Talbot et al. |
| 8,427,365 B2 | 4/2013 | Dai et al. |
| 8,542,146 B2 | 9/2013 | Vollath |
| 8,600,601 B2 | 12/2013 | Kellar et al. |
| 8,766,848 B2 | 7/2014 | Dai et al. |
| 8,849,481 B1 | 9/2014 | Gavrilets et al. |
| 9,057,780 B2 | 6/2015 | Bar-Sever et al. |
| 9,116,228 B2 | 8/2015 | Ellum et al. |
| 9,128,176 B2 | 9/2015 | Seeger |
| 9,146,319 B2 | 9/2015 | Leandro |
| 10,605,926 B2 | 3/2020 | Lie et al. |
| 10,627,528 B2 | 4/2020 | Lie et al. |
| 10,809,391 B2 | 10/2020 | Lie et al. |
| 2005/0151683 A1 | 7/2005 | Sharpe et al. |
| 2006/0017611 A1 | 1/2006 | Hatch et al. |
| 2006/0290566 A1 | 12/2006 | Syrjarinne et al. |
| 2007/0001900 A1 | 1/2007 | Heppe et al. |
| 2008/0074319 A1 | 3/2008 | Han et al. |
| 2009/0102708 A1 | 4/2009 | Dai et al. |
| 2011/0187590 A1 | 8/2011 | Leandro |
| 2011/0210889 A1 | 9/2011 | Dai et al. |
| 2011/0267226 A1 | 11/2011 | Talbot et al. |
| 2011/0307138 A1 | 12/2011 | Kellar et al. |
| 2012/0029810 A1* | 2/2012 | Dai ............... G01C 21/20 |
| | | 701/489 |
| 2012/0163419 A1 | 6/2012 | Seeger |
| 2012/0306694 A1 | 12/2012 | Chen et al. |
| 2013/0271318 A1 | 10/2013 | Doucet et al. |
| 2013/0335266 A1 | 12/2013 | Vollath |
| 2014/0015712 A1 | 1/2014 | Leandro et al. |
| 2014/0062778 A1* | 3/2014 | Ashjaee ............. G01S 19/20 |
| | | 342/357.58 |
| 2014/0378171 A1 | 12/2014 | Rudow et al. |
| 2015/0161872 A1 | 6/2015 | Beaulieu et al. |
| 2016/0377736 A1 | 12/2016 | Zeitzew et al. |
| 2017/0269216 A1 | 9/2017 | Dai et al. |
| 2017/0269231 A1 | 9/2017 | Dai et al. |
| 2017/0299728 A1 | 10/2017 | Lie et al. |
| 2017/0299731 A1 | 10/2017 | Lie et al. |
| 2018/0113473 A1 | 4/2018 | Webber et al. |
| 2018/0210091 A1 | 7/2018 | Di Federico et al. |
| 2019/0120973 A1 | 4/2019 | Martin et al. |

FOREIGN PATENT DOCUMENTS

| | | |
|---|---|---|
| JP | 2009281737 A | 12/2009 |
| WO | WO2010074777 A1 | 7/2010 |

OTHER PUBLICATIONS

International Search Report and Written Opinion, re PCT Application No. PCT/US16/38610 dated Aug. 20, 2016 (14 pages).

Trimble RTX Technology for Infrastructure Applications, An Innovative New Approach for Worldwide Precise Point Positioning [online], Trimble, 2012 [retrieved on Jun. 20, 2016]. Retrieved from the Internet: <URL: https://www.trimble.cominfrastructurepdf/ 022506-160_RTX_Technology_Bro_0912_LR_pbp.pdf>.

Beran, Tomas, Sunil B. Bisnath, and Richard B. Langley. "Evaluation of high-precision, single-frequency GPS point positioning models." In Ion GNSS 17th International Technical Meeting of the Satellite Division, Sep. 21-24, 2004, pp. 1893-1901.

Chassagne, Olivier. "The Future of Satellite Navigation, One-Centimeter Accuracy with PPP", GNSS Forum, pp. 51-54, Mar.-Apr. 2012 [online] [retrieved on Aug. 31, 2016]. Retrieved from the Internet: <URL: http://www.insidegnss.com/auto/marapr12-Chassagne.pdf>.

Choy, Suelynn. "GNSS Precise Point Positioning: A Fad or the Future of Satellite Navigation and Positioning?" Lecture slides [online].School of Mathematical and Geospatial Sciences Royal Melbourne Institute of Technology University, Australia, 2014 [retrieved on Aug. 31, 2016]. Retrieved from the Internet: <URL: http://www.fig.net/resources/proceedings/fig_proceedings/fig2014/ppt/TS05A/Choy.pdf>.

Murfin, Tony. "Hexagon's Acquisition of Veripos: Why Did This Go Down?" GPS World [online], Apr. 16, 2014 [retrieved on Aug. 31, 2016]. Retrieved from the Internet: <URL: http://gpsworld.com/hexagons-acquisition-of-veripos-why-did-this-go-down/>.

Murfin, Tony. "Look, No Base-Station!—Precise Point Positioning (PPP)." GPS World [online], Mar. 20, 2013 [retrieved Aug. 31, 2016]. Retrieved from the Internet: <URL: http://gpsworld.com/look-no-base-station-precise-point-positioning-ppp/>.

Laurichesse, Denis. "Innovation: Carrier-Phase Ambiguity Resolution, Handling the Biases for Improved Triple-Frequency PPP Convergence." GPS World, Apr. 3, 2015 [online], [retrieved Aug. 31, 2016]. Retrieved from the Internet: <URL: http://gpsworld.com/innovation-carrier-phase-ambiguity-resolution/>.

Dixon, Kevin. "StarFire: A Global SBAS for Sub-Decimeter Precise Point Positioning." NavCom Technology Inc., Ion GNSS 19th International Technical Meeting of the Satellite Division [online], Sep. 26-29, 2006 [retrieved on Aug. 31, 2016]. Retrieved from the Internet: <URL: http://www.gdgps.net/system-desc/papers/starfire.pdf>.

Shi, J. and Gao, Y. "A Comparison of Three PPP Integer Ambiguity Resolution Methods." GPS Solutions 18.4 [online], 2013, pp. 519-528 [retrieved on Aug. 31, 2016]. Retrieved from the Internet: <URL: http://link.springer.com/article/10.1007/s10291-013-0348-2>.

Leandro, R., et al. "RTX Positioning: The Next Generation of cm-accurate Real-Time GNSS Positioning." Trimble Terrasat GmbH [online brochure], Sep. 2012 [retrieved on Aug. 31, 2016]. Retrieved from the Internet: <URL: https://www.trimble.com/positioning-services/pdf/WhitePaper_RTX.pdf>.

Goode, Matthew. "New Developments In Precise Offshore Positioning." Ocean Business / Offshore Survey [online presentation], Apr. 15-16, 2015, Southampton, United Kingdom [retrieved on Aug. 31, 2016]. Retrieved from the Internet: <URL: http://www.oceanbusiness.com/wp-content/uploads/2015/04/1410_MatthewGoode.pdf>.

Ott, Lee. "Use of Four GNSS Systems in Operational Precise Point Positioning Service." Furgo Satellite Positioning [online presentation], 2015 [retrieved on Aug. 31, 2016]. Retrieved from the Internet: <URL: http://www.gps.gov/cgsic/meetings/2015/ott.pdf>.

Toor, Pieter. "Munich Satellite Navigation Summit 2014." Veripos, Ltd. [online presentation], Mar. 26, 2014 [retrieved on Aug. 31, 2016]. Retrieved from the Internet: <URL: http://www.terrastar.net/files/docs/Munich_Summit_2014_-_PPP_Session_-_Pieter_Toor_-_VERIPOS.pdf>.

Jokinen, AS. "Enhanced Ambiguity Resolution and Integrity Monitoring Methods for Precise Point Positioning." Centre for Transport Studies, Department of Civil and Environmental Engineering, Imperial College London [online thesis], Aug. 2014 [retrieved on Aug. 31, 2016]. Retrieved from the Internet: <URL: https://spiral.imperial.ac.uk/bitstream/10044/1/24806/1/Jokinen-A-2014-PhD-Thesis.pdf>.

(56) References Cited

OTHER PUBLICATIONS

"Real-time Service." International GNSS Service [online article], 2015 [retrieved on Aug. 31, 2016]. Retrieved from the Internet: <URL: http://www.igs.org/rts>.

"Introducing the IGS Real-Time Service (RTS)." International GNSS Service [online], 2015 [retrieved on Aug. 31, 2016]. Retrieved from the Internet <URL: ftp://igs.org/pub/resource/pubs/IGS_Real_Time_Service-131031.pdf>.

Schrock, Gavin, "PPP: IGS Announces The Launch Of RTS-IGS." xyHt [online], Apr. 20, 2015 [retrieved on Aug. 31, 2016]. Retrieved from the Internet: <URL: http://www.xyht.com/professional-surveyor-archives/ppp-igs-announces-the-launch-of-rts-igs/>.

Laurichesse, D., Mercier, F., and Berthias, JP. "Real-time PPP with Undifferenced Integer Ambiguity Resolution, Experimental Results." Proceedings of the Ion GNSS [online] Sep. 21-24, 2010 [retrieved on Aug. 31, 2016]. Retrieved from the Internet <URL: http://www.ppp-wizard.net/Articles/laurichesse_ion_gnss_2010_bdp.pdf>.

Blewitt, Geoffrey. "Carrier Phase Ambiguity Resolution for the Global Positioning System Applied to Geodetic Baselines up to 2000 km." Journal of Geophysical Research [online], vol. 94, No. B8, pp. 10187-10203, Aug. 10, 1989 [retrieved on Aug. 31, 2016]. Retrieved from the Internet: <URL: http://www.colorado.edu/ASEN/asen6090/blewitt.pdf#page=1&zoom=auto,-154,811>.

Banville, Simon. "Ambiguity Resolution." BlackDot GNSS [online], Apr. 25, 2015 [retrieved on Sep. 6, 2016]. Retrieved from the Internet <URL: http://www.blackdotgnss.com/2015/04/25/ambiguity-resolution/>.

Teunissen, PJG. "Towards a Unified Theory of GNSS Ambiguity Resolution." Journal of Global Positioning Systems [online], vol. 2, No. 1, pp. 1-12, 2003 [retrieved on Sep. 6, 2016]. Retrieved from the Internet <URL: http://citeseerx.ist.psu.edu/viewdoc/download?doi=10.1.1.454.4430&rep=rep1&type=pdf>.

Teunissen, PJG. "Least-Squares Estimation of the Integer GPS Ambiguities." International Association of Geodesy General Meeting, Section IV: Theory and methodology, Beijing, China, 1993 [online] retrieved on Sep. 6, 2016]. Retrieved from the Internet: <URL: http://citeseerx.ist.psu.edu/viewdoc/download?doi=10.1.1.475.9393&rep=rep1&type=pdf>.

"Hemisphere GNSS Debuts Atlas GNSS Correction Service." GPS World Staff. GPS World [online], Jun. 15, 2015 [retrieved on Sep. 6, 2016]. Retrieved from the Internet: <URL: http://gpsworld.com/hemisphere-gnss-debuts-atlas-gnss-correction-service/>.

Teunissen, PJG. "GNSS Ambiguity Bootstrapping: Theory and Application." Proceedings of International Symposium on Kinematic Systems in Geodesy, Geomatics and Navigation [online], pp. 246-254, Jun. 2001 [retrieved on Nov. 16, 2016]. Retrieved from the Internet <URL: http://www.ucalgary.ca/engo_webdocs/SpecialPublications/KIS%2001/PDF/0503.PDF>.

Teunissen, PJG. "Theory of Integer Equivariant Estimation with Application to GNSS." Journal of Geodesy [online], vol. 77, No. 7-8, pp. 402-410, 2003 [retrieved on Nov. 16, 2016]. Retrieved from the Internet <URL: http://link.springer.com/article/10.1007/s00190-003-0344-3>.

Wen, Zhibo, et al. "Best Integer Equivariant Estimation for Precise Point Positioning." Institute for Communications and Navigation 2012 Proceedings [online], pp. 279-282, Sep. 12-14, 2012 [retrieved on Sep. 6, 2016]. Retrieved from the Internet <URL: http://ieeexplore.ieee.org/xpls/abs_all.jsp?arnumber=6338525&tag=1>.

Shi, J. and Gao, Y. "A Fast Integer Ambiguity Resolution Method for PPP." Proceedings of the Ion GNSS [online], Nashville, TN, pp. 3728-3734, Sep. 17-21, 2012 [retrieved on Nov. 16, 2016]. Retrieved from the Internet <URL: https://www.ion.org/publications/abstract.cfm?articleID=10548>.

Teunissen, PJG. "The Least-squares Ambiguity Decorrelation Adjustment: A Method for Fast GPS Integer Ambiguity Estimation." Journal of Geodesy [online], vol. 70, No. 1-2 pp. 65-82, 1995 [retrieved on Nov. 16, 2016]. Retrieved from the Internet <URL: http://link.springer.com/article/10.1007/BF00863419>.

De Jonge, P. and Tiberius, C. "The LAMBDA Method for Integer Ambiguity Estimation: Implementation Aspects." Publications of the Delft Computing Centre [online], LGR-Series No. 12, pp. 1-47, Aug. 1996 [retrieved on Sep. 6, 2016]. Retrieved from the Internet <URL: http://www.citg.tudelft.nl/fileadmin/Faculteit/CiTG/Over_de_faculteit/Afdelingen/Afdeling_Geoscience_and_Remote_Sensing/pubs/lgr12.pdf>.

Chang, XW., Yang, X. and Zhou, T. "MLAMBDA: A Modified LAMBDA Method for Integer Least-squares Estimation." Journal of Geodesy [online], vol. 79, No. 9, pp. 552-565, Dec. 2005 [retrieved on Sep. 6, 2016]. Retrieved from the Internet <URL: http://www.cs.mcgill.ca/~chang/pub/MLAMBDA.pdf>.

Baroni, L. and Kuga, HK. "Evaluation of Two Integer Ambiguity Resolution Methods for Real Time GPS Positioning." WSEAS Transactions on Systems 8.3, pp. 323-333, Mar. 2009 [retrieved on Sep. 6, 2016]. Retrieved from the Internet <URL:https://www.researchgate.net/profile/Helio_Kuga/publication/41146341_Evaluation_of_Two_Integer_Ambiguity_Resolution_Methods_for_Real_Time_GPS_Positioning/links/543687fe0cf2bf1f1f2bd8d1.pdf>.

Verhagen, Sandra. "The GNSS Integer Ambiguities: Estimation and Validation." Delft Institute of Earth Observation and Space Systems, Delft University of Technology, Jan. 31, 2005 [retrieved on Sep. 6, 2016]. Retrieved from the Internet <URL: http://repository.tudelft.nl/islandora/object/uuid:07c6f2be-3a70-42aa-97b3-894a5770454d/?collection=research>.

Li, P. and Zhang, X. "Precise Point Positioning With Partial Ambiguity Fixing." Sensors [online journal], vol. 15, No. 6, pp. 13627-13643, Jun. 10, 2015 [retrieved on Sep. 6, 2016]. Retrieved from the Internet :<URL: http://www.mdpi.com/1424-8220/15/6/13627/htm>.

Verhagen, Sandra. et al. "GNSS Ambiguity Resolution: Which Subset to Fix?" IGNSS Symposium 2011, International Global Navigation Satellite Systems Society, University of New South Wales, Sydney, Australia, Nov. 15-17, 2011 [retrieved on Sep. 6, 2016]. Retrieved from the Internet :<URL: http://repository.tudelft.nl/islandora/object/uuid:075deb5b-5253-4daf-97be-f7126519612b/?collection=research>.

Pan, L., Cai, C., Santerre, R. and Zhu, J. "Combined GPS/GLONASS Precise Point Positioning with Fixed GPS Ambiguities." Sensors [online journal], vol. 14, No. 9, pp. 17530-17547, Sep. 18, 2014 [retrieved on Sep. 6, 2016]. Retrieved from the Internet: <URL: http://www.mdpi.com/1424-8220/14/9/17530/htm>. <DOI:10.3390/s140917530>.

Gratton, L., Joerger, M. and Pervan, B. "Carrier Phase Relative RAIM Algorithms and Protection Level Derivation." Journal of Navigation [online], vol. 63, No. 2, pp. 215-231, Apr. 1, 2010 [retrieved on Sep. 6, 2016]. Retrieved from the Internet: <URL:https://www.cambridge.org/core/journals/journal-of-navigation/article/div-classtitlecarrier-phase-relative-raim-algorithms-and-protection-level-derivationdiv/AEA4489E97E3C131EBD3E2184B3F0DD7> <DOI:10.1017/S0373463309990403>.

"Trimble XFill RTK." Trimble Navigation Limited [online white paper], Sep. 2012 [retrieved on Sep. 6, 2016]. Retrieved from the Internet: <URL: http://trl.trimble.com/docushare/dsweb/Get/Document-630776/022543-551_Trimble%20xFill%20White%20Paper_1012_sec.pdf>.

NovAtelCORRECT. NovAtel Inc. [online brochure], Nov. 2015 [retrieved on Sep. 6, 2016]. Retrieved from the Internet: <URL: http://www.novatel.com/assets/Documents/Papers/NovAtelCORRECT-Brochure.pdf>.

Reußnerr, N. and Wanniger, L. "GLONASS Inter-frequency Code Biases and PPP Carrier-Phase Ambiguity Resolution." Geodetic Institute, Technische Universität Dresden, IGS Workshop, Jul. 2012 [retrieved Aug. 31, 2016]. Retrieved from the Internet: <URL: https://tu-dresden.de/bu/umwelt/geo/gi/gg/ressourcen/dateien/veroeffentlichungen/igs2012.pdf?lang=en>.

Sleewagen, J. et al. "Digital versus Analog: Demystifying GLONASS Inter-Frequency Carrier Phase Biases." Inside GNSS [online], May/Jun. 2012 [retrieved Aug. 31, 2016]. Retrieved from the Internet :<URL: http://www.insidegnss.com/auto/mayjune12-Sleewaegen.pdf>.

Carcanague, S. et al. "Finding the Right Algorithm Low-Cost, Single-Frequency GPS/GLONASS RTK for Road Users." Inside GNSS [online], vol. 8 No. 6, pp. 70-80, Nov./Dec. 2013 [retrieved

(56) References Cited

OTHER PUBLICATIONS

Aug. 31, 2016]. Retrieved from the Internet :<URL: http://www.insidegnss.com/auto/novdec13-WP.pdf>.

Wang, J. and Feng, Y. "Reliability of Partial Ambiguity Fixing with Multiple GNSS Constellations." Journal of Geodesy [online], vol. 87, No. 1, pp. 1-14, Jun. 12, 2012 [retrieved Aug. 31, 2016]. Retrieved from the Internet:<URL: http://link.springer.com/article/10.1007/s00190-012-0573-4> <DOI:10.1007/s00190-012-0573-4>.

Petovello, Mark. "GNSS Solutions: Absolutely Relative Positioning", Solutions, InsideGNSS [online], p. 36, May-Jun. Ed., 2011, [retrieved Jan. 20, 2017]. [Retrieved from the Internet: URL <http://www.insidegnss.com/auto/mayjune11-Solutions.pdf>.

Ding, W. and Wang, J. "Precise Velocity Estimation with a Stand-Alone GPS Receiver", Journal of Navigation, 64(2), pp. 311-325, 2011, DOI: 10.1017/S0373463310000482.

Kirkko-Jaakkola, M. et al. "A RAIM Approach to GNSS Outlier and Cycle Slip Detection Using L1 Carrier Phase Time-differences", IEEE Workshop on Signal Processing Systems [online], 2009, pp. 273-278, DOI: 10.1109/SIPS.2009.5336264.

Elsobeiey, M. and El-Rabbany, M. "Convergence Time Improvement of Precise Point Positioning", TS04J—Geodetic Applications in Various Situations, 5249 [online], [retrieved on Jan. 20, 2017]. [Retrieved from the Internet: URL <http://www.fig.net/resources/proceedings/fig_proceedings/fig2011/papers/ts04j/ts04j_elsobeiey_elrabbany_5249.pdf>.

Geng, J. et al., "Towards PPP-RTK: Ambiguity resolution in real-time precise point positioning", Advances in Space Research, vol. 47, Issue 10, pp. 1664-1673, GNSS Remote Sensing—2, Institute of Engineering Surveying and Space Geodesy, The University of Nottingham, Nottingham NG7 2TU, UK, May 17, 2011.

Traugott, JP. "Precise flight trajectory reconstruction based on time-differential GNSS carrier phase processing" [online] Verlag Dr. Hut; 2011, [retrieved on Jan. 20, 2017]. [Retrieved from the Internet: URL <https://mediatum.ub.tum.de/doc/1002062/1002062.pdf>.

\* cited by examiner

SATELLITE NAVIGATION RECEIVER FOR RELATIVE POSITIONING WITH BIAS ESTIMATION

This is a divisional application of U.S. application Ser. No. 14/857,109, filed Sep. 17, 2015, which claims the benefit of U.S. provisional application No. 62/185,987, filed Jun. 29, 2015, and entitled SATELLITE NAVIGATION RECEIVER WITH INITIAL POSITION BIAS COMPENSATION, where the above referenced prior applications are hereby incorporated by reference herein.

FIELD OF THE DISCLOSURE

This disclosure relates to a satellite navigation receiver for relative positioning with bias estimation.

BACKGROUND

In some prior art, a satellite navigation receiver may use relative positioning techniques to estimate the position of receiver. Initial bias in the position of the receiver can degrade the accuracy of both a relative positioning engine and an absolute positioning engine. For example, in some prior art, a satellite navigation receiver may be unable to derive an accurate absolute position estimate from a relative positioning engine without a known initial position or initial position bias compensation. In certain prior art, relative positioning engines may lack the capability to estimate or compensate for bias in position estimates associated with atmospheric (e.g. tropospheric) delay between a satellite and a receiver, or bias between a satellite clock and a receiver clock.

Carrier-phase-based time differencing can provide highly precise position results. However, in certain prior art, carrier-phase-based time differencing can only be used for limited time periods because error growth over longer time periods tends to degrade accuracy of the position results. Within limited time periods, the following assumptions to position estimation can apply: (a) some atmospheric error sources cancel by virtue of the time differencing; (b) the satellite orbit and clock errors vanish; and (c) some changes in the set of visible satellites over time can be ignored. Carrier-phase-based time differencing presents challenging technical problems over time periods greater than the limited time periods because atmospheric and clock errors are not easily modeled or estimated, and tracking changes in visible satellites over time is complex.

Accordingly, there is a need for a satellite navigation receiver with bias estimation or compensation for a relative position estimate that is independent of convergence of a precise position solution and able to operate over arbitrarily long time intervals without suffering from large position drift.

SUMMARY

In one embodiment, a satellite navigation receiver comprises a receiver module (e.g., receiver front-end module) for receiving a set of one or more carrier signals from satellite transmitters. The receiver or a measurement module is configured to determine correlations of each carrier signal in the set to a local reference carrier signal or signals. The receiver or a tracking module is arranged to process the determined correlations to track one or more carrier signals for estimation of respective changes in phase measurements over time between a receiver antenna and one or more satellite transmitters that transmit the received signal as the receiver changes position with respect to an initial position. A relative position estimator estimates the change in position of the navigation receiver with respect to the initial position over the time period time by time-differencing of the phase measurements of the one or more tracked carrier signals. The relative position estimator models or estimates one or more biases selected from the group comprising: a bias in the initial position (e.g., initial position bias) of the receiver, a receiver clock bias with respect to a reference time of one or more satellite clocks (e.g., temporal change in receiver clock bias over time with respect to the reference time), or atmospheric propagation delay bias between a receiver and a respective satellite (e.g., a temporal change in atmospheric propagation delay bias over time between the receiver and the respective satellite). In one embodiment, the receiver or relative position estimator can compensate for one or more of the biases to provide a compensated relative position of the receiver (e.g., or to derive an absolute position in certain embodiments).

DETAILED DESCRIPTION

Figure 1A:
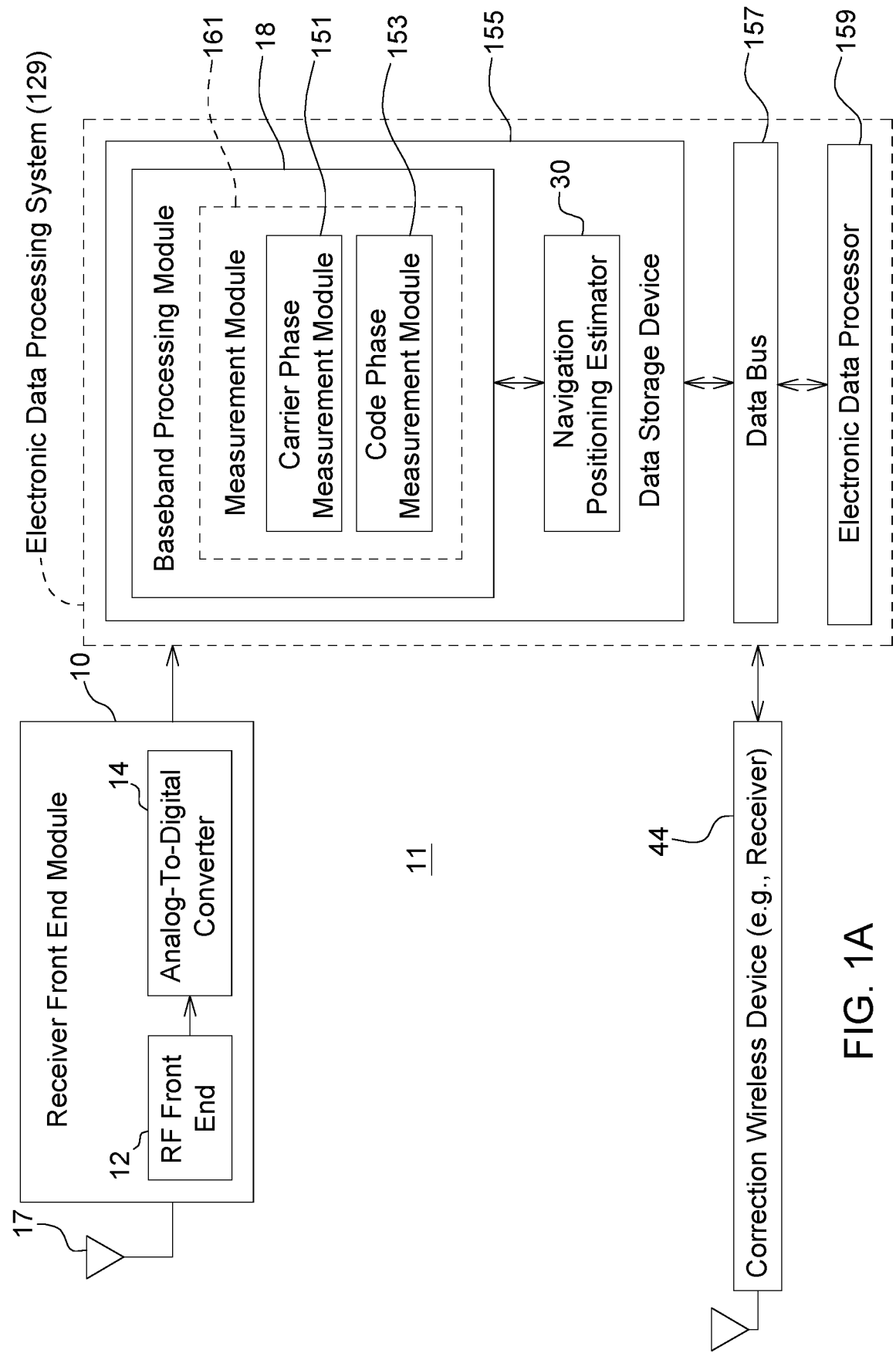
FIG. 1A is a block diagram of one embodiment of a satellite navigation receiver with bias estimation or compensation.

In accordance with one embodiment, FIG. 1A discloses a system or receiver 11 (e.g., satellite navigation receiver) capable of reception of received signals that comprise one or more carrier signals (e.g., a first carrier (L1), a second carrier (L2) and a third carrier (L5) of Global Positioning System (GPS)) transmitted by satellites. The received signal is transmitted from one or more satellites, such as a navigation satellite, or such as a Galileo-compatible navigation satellite, (Russian Global Navigation Satellite System) GLONASS satellite, or Global Positioning System (GPS) satellite. The satellites have known orbital positions versus time that can be used to estimate the position between an antenna 17 of the receiver 11 and each satellite based on the propagation time of one or more received signals between the four or more satellites and the antenna 17 of the receiver 11.

As used in this document, "CD" shall refer to code and "CR" shall refer to the carrier of the received signal or a digital representation of one or more samples of the received signal. The code comprises a modulating code (e.g., pseudo-random noise code modulated with information) that modulates the carrier. "I" shall refer to an in-phase signal, whereas "Q" shall refer to a quadrature phase signal.

In any of the above referenced drawings of this document, any arrow or line that connects any blocks, components, modules, multiplexers, memory, data storage, accumulators, data processors, electronic components, oscillators, signal generators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system, method and receiver (e.g., 11 or 111) disclosed in this document may comprise a computer-implemented system, method or receiver in which one or more data processors (e.g., 159) process, store, retrieve, and otherwise manipulate data via data buses (e.g., 157) and one or more data storage devices (e.g., accumulators or memory, such as 155) as described in this document and the accompanying drawings. As used in this document, "configured to, adapted to, or arranged to" mean that the data processor or receiver (e.g., 11 or 111) is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in FIG. 1A, FIG. 1B and/or any other drawing in this disclosure. Alternately, separately from or cumulatively with the above definition, "configured to, adapted to, or arranged to" can mean that the receiver (e.g., 11 or 111) comprises one or more components described herein as software modules, equivalent electronic hardware modules, or both to execute any referenced functions, mathematical operations, calculations, determinations, processes, methods, algorithms, and subroutines.

Precise point positioning (PPP) means the use of precise satellite orbit and clock corrections provided wirelessly via correction data, rather than normal satellite broadcast information (ephemeris data) that is encoded on the received satellite signals, to determine a relative position or absolute position of a mobile user satellite navigation receiver. PPP uses correction data that is applicable to a wide geographic area or based on a network of reference satellite receiver stations via a correction wireless device. PPP may be used without one or more local reference satellite receiver stations to provide local differential corrections (e.g., real time kinematic or RTK corrections) to the mobile receiver via a correction wireless device. Although the resulting positions can be accurate within a few centimeters using state-of-the-art algorithms, conventional precise point positioning can take a long convergence time of up to tens of minutes to determine the ambiguity integer or floating ambiguity value to achieve the purported (e.g., advertised) steady-state accuracy; hence, such long convergence time is typically a limiting factor in the applicability of PPP. Here, the method and receiver of this disclosure does not aim to improve the convergence time of PPP. However, the receiver or method of this disclosure comprises a relative position estimator that can achieve steady-state level precision for relative position prior to or independent of convergence or determination of an ambiguity integer or accurate floating ambiguity value of any associated precise position estimator of the receiver.

In accordance with the embodiment of FIG. 1A, the receiver 11 comprises a receiver front-end module 10 coupled to an electronic data processing system 129. Further, a correction wireless device 44 (e.g., transceiver or receiver) may provide correction data or differential correction data to enhance accuracy of the position estimates provided or estimated by the receiver 11.

In one embodiment, the receiver front-end module 10 comprises a radio frequency (RF) front end 12 coupled to an analog-to-digital converter 14. The receiver front-end module 10 or the RF front end 12 receives a set of carrier signals from one or more satellite transmitters on satellites. The analog-to-digital converter 14 converts the set of carrier signals into digital signals, such as digital baseband signals or digital intermediate frequency signals for processing by the electronic data processing system 129.

In one embodiment, the electronic data processing system 129 comprises a baseband processing module 18 (e.g., baseband/intermediate frequency processing module) and a navigation positioning estimator 30. For example, the baseband processing module 18 and the navigation positioning estimator 30 may be stored in a data storage device 155.

In one configuration, the baseband processing module 18 comprises a carrier phase measurement module 151, a code phase measurement module 153, or both (e.g., measurement module 161). The carrier phase measurement module 151 facilitates the measurement of carrier phase of one or more carrier signals received by the receiver 11. Similarly, the code phase measurement module 153 supports the measurement of code phase of one or more code signals that modulate the carrier signals received by the receiver 11.

The navigation positioning estimator 30 can use the carrier phase measurements, the code phase measurements or both to estimate the range between the receiver (11 or 111) and one or more satellites, or the position (e.g., three dimensional coordinates) of the receiver with respect to one or more satellites (e.g., four or more satellites). The code phase measurements or carrier phase measurements can be converted from propagation times, between each satellite and the receiver (11 or 111) that is within reception range of the receiver, to distances by dividing the propagation time by the speed of light, for example.

In the electronic data processing system 129, the data storage device 155 is coupled to a data bus 157. An electronic data processor 159 may communicate with the data storage device 155 and the correction wireless device 44 via the data bus 157. As used throughout the document the data processor (e.g., 159) may comprise one or more of the following: an electronic data processor, a microprocessor, a microcontroller, an application specific integrated circuit (ASIC), digital signal processor (DSP), a programmable logic device, an arithmetic logic unit, or another electronic data processing device. The data storage device 155 may comprise electronic memory, registers, shift registers, volatile electronic memory, a magnetic storage device, an optical storage device, or any other device for storing data.

Figure 1B:
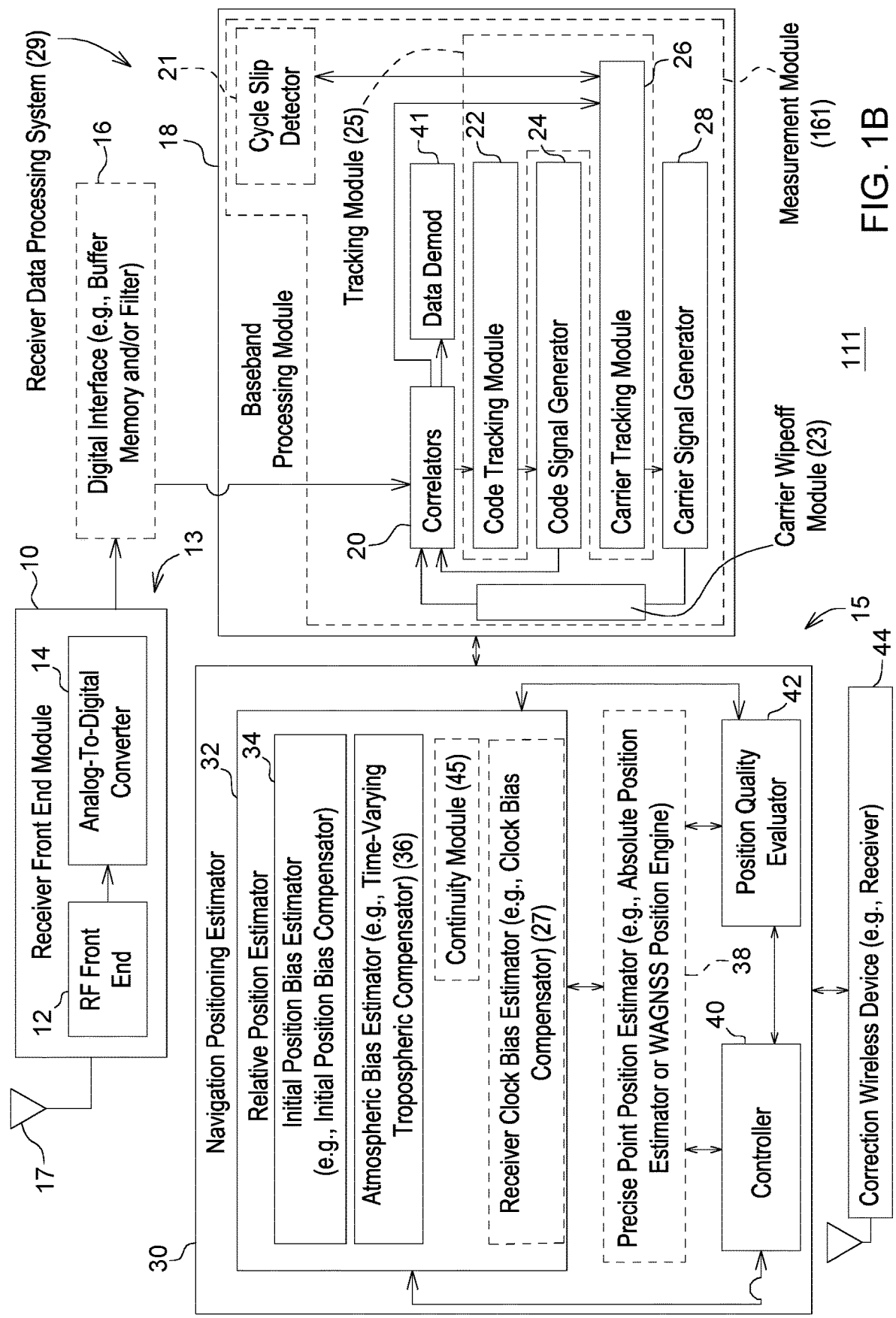
FIG. 1B is a block diagram of another embodiment of a satellite navigation receiver with bias estimation or compensation.

The receiver of FIG. 1B is similar to the receiver of FIG. 1A, except the receiver of FIG. 1B shows illustrative details of one embodiment of the baseband processing module 18 and the navigation positioning estimator 30. Like reference numbers indicate like elements or features in FIG. 1A and FIG. 1B.

In accordance with one embodiment, FIG. 1B illustrates a receiver 111 that comprises an analog receiver portion 13 coupled to a digital receiver portion 15. The analog receiver portion 13 comprises an antenna 17, and a receiver front-end module 10. The receiver 111 receives a received signal that comprises one or more carrier signals. The digital receiver portion 15 includes that portion of the receiver that processes data after the analog-to-digital conversion by the analog-to-digital converter 14 (ADC or A/D converter). For example, the digital receiver portion 15 can comprise a receiver data processing system 29. The receiver data processing system 29 is analogous to the electronic data processing system 129 of FIG. 1A, which comprises an electronic data processor 159, a data storage device 155 (e.g., electronic memory) and a data bus 157 for communication between the electronic data processor 159 and the data storage device 155, where software instructions and data are stored in the data storage device 155 and executed by the data processor to implement any of the blocks, components or modules (e.g., electronic modules, software modules, or both) illustrated in FIG. 1A and FIG. 1B. The receiver (11, 111) may comprise a location-determining receiver for: (a) determining a position (e.g., relative position or change in relative position from an initial time t0 an observation time, or absolute position) of a receiver antenna 17 (e.g., as the receiver moves over time), (b) a range-determining receiver for determining a range or distance between the receiver antenna 17 and a satellite (e.g., satellite antenna) or (c) determining ranges between the receiver antenna 17 and one or more satellites. Each position may be defined as a point or coordinates in two or three dimensions at a given time. The estimated position of the receiver (11, 111) may represent a change in position over time or an absolute position of the receiver with respect to reference coordinates or real world coordinates.

In one embodiment, a receiver front-end module 10 and the radio frequency (RF) front end 12 receives the received signal at antenna 17. In one embodiment, the RF front end 12 comprises an amplifier, a down-conversion mixer, and a local oscillator, although other configurations are possible. For example, the amplifier comprises radio frequency (RF) or microwave amplifier (e.g., low noise amplifier) that is coupled to the antenna 17 for receiving the received signal that is transmitted from one or more satellites. The amplifier provides an amplified signal to the down-conversion mixer as a first input. The local oscillator provides a signal to the down-conversion mixer as a second input. The down-conversion mixer moves or lowers the signal spectrum of the received signal from RF to an intermediate frequency (IF) or baseband frequency. The down-conversion system may include one or more mixing, amplifying, and filtering stages.

The output of the down-conversion mixer or the output of the RF front end 12 is coupled to an analog-to-digital converter 14 (ADC). The ADC 14 converts the analog intermediate frequency signal or analog baseband signal to a digital signal. The digital signal comprises one or more digital samples that are available at a sampling rate. Each sample has a finite quantization level and each sample is capable of being processed by an electronic data processing system (129, 29) or digital receiver portion 15.

In one embodiment, the output of the receiver front-end module 10 is inputted to an optional digital interface 16. The optional digital interface 16 is indicated as optional by the dashed lines that represent the block of FIG. 1B. The optional digital interface 16 may comprise buffer memory that temporarily stores the output of the analog-to-digital converter 14 for processing by the digital receiver portion 15 or a digital filter that filters one or more down-converted carrier signals. For example, the digital filter may comprise a band-pass filter that provides a filtered L1 carrier signal, a filtered L2 carrier signal, and filtered L5 carrier signal.

The digital signal outputted by the ADC 14 is fed into the baseband processing module 18 or the carrier wipe-off module 23. In one embodiment, the carrier wipe-off module 23 converts the digital samples of digital signal to an exact baseband digital signal representation by removing the residual CR frequency. The carrier signal generator 28 (e.g., numerically controlled oscillator (NCO) module) provides a local estimation of CR phase to each digital sample, which is used to remove the residual CR frequency and phase in the sample. In one embodiment, the carrier wipe-off module 23 outputs I and Q components of the digital signal for input into a set of correlators 20.

An output of the carrier wipe-off module 23 is fed into a bank or set of correlators 20 or correlator modules. In one embodiment, there is at least one correlator 20 or correlator module per received channel or each carrier of the received signal, where each satellite within a set of satellites may transmit at least one channel or carrier. In one embodiment, the set of correlators 20 may comprise a code wipe-off portion and an integration-and-dump module. In one embodiment, the set of correlators 20 and the code signal generator 24 (e.g., code numerically controlled oscillator) comprises a code wipe-off module.

In one embodiment, the set or bank of correlators 20 has multiple outputs that are used to synchronize the local CD phase, CR frequency, and CR phase estimation with the received samples. For example, each correlator 20 comprises one or more of the following modules: a CD wipe-off portion, one or more integration-and-dump modules, one or more multipliers or mixers.

As used in this document, a module may comprise hardware, software, or both. In one embodiment, each correlator 20 maximizes a correlation between the received signal with a locally generated code by synchronizing the locally generated CD phase with the CD phase in digital sample or digital signal. Further, multiple locally generated CD signals (e.g., early, prompt and late CD signals) are used to form a corresponding CD misalignment signal using various discriminator functions.

A code signal generator 24 (e.g., numerically controlled oscillator) generates a locally generated replica of a pseudo random noise code, a pseudo noise (PN) code sequence, or the like. The code signal generator 24 may be associated with a shift register or another device to provide multiple outputs that are offset in time or phase with respect to each other. For example, the code signal generator 24 has an early output, a prompt output and a late output that are provided to the set of correlators 20. "E," "P," and "L" shall mean early, prompt and late, respectively. The early output provides an early PN code that is advanced against the current estimated code phase by a known time period (e.g., one chip); the prompt output provides a prompt PN code that reflects the current estimated code phase; the late output provides a late PN code that is delayed in time with respect to the prompt PN code by a known time period (e.g., one chip). If correlations are available between the received signal and the early, prompt and late variants of the locally generated replica of the received signal, the receiver (11 or 111) may adjust the phase and time delay (e.g., via shift registers) of the locally generated replica in an attempt to maximize correlation, for example.

In one embodiment, the code signal generator 24 may comprise any generator for generating a spread spectrum code, spread spectrum sequence, binary sequences, Gold codes, PN code, a pseudo-random noise code sequence, or a PN code that is similar to a spread spectrum code, spread spectrum sequence, binary sequences, Gold codes, pseudo-random noise code, pseudo-random noise code sequence, or a PN code transmitted by a transmitter of a satellite for reception by the receiver (11 or 111) as the received signal (e.g., one or more carrier signals modulated with the PN code). In another embodiment, the code signal generator 24 may be formed of series of shift registers that are loaded with an initial starting code sequence, where the shift registers have various selectable or controllable taps for providing feedback and reiterative values as the output.

In some embodiments, the three versions (E, P, L) of PN code by the code signal generator 24 can interact with the two versions (I,Q) of the received signals of each carrier to produce various permutations of local replica signals to generate different correlations through the integration-and-dump module. A bank of correlations, which is outputted by the correlators 20, is used for decoding, demodulating, CD and CR phase tracking.

The carrier tracking module 26 and code tracking module 22 are collectively referred to as the tracking module 25. The tracking module 25 supports measurement of the CR frequency, CR phase, and CD phase (e.g., individually or collectively, measurement data) of the received signals to control one or more locally generated reference signals with respect to corresponding received signals (derived from the composite received signal) to maximize correlation of the corresponding received signals to the respective locally generated reference signals. In one embodiment, there are multiple received signals because the receiver (11, 111) receives four received signals from at least four different satellite transmitters to estimate the position of the receiver antenna 17. For example, the code tracking module 22 or carrier tracking module 26 can generate measurement data that the data processor or receiver uses to control an adjustable time delay (e.g., route data through known number or sequence of shift registers), or engage in other data processing of one or more digital signals associated with a locally generated reference signal with respect to the received signal to maximize correlation of each received signal to the corresponding locally generated reference signal.

In one embodiment, the carrier tracking module 22 may comprise one or more of the following: a CR measurement module (e.g., similar to carrier measurement module 161), a CR phase counter, a frequency detector, and a phase detector. For example, the CR phase counter counts both the number of integer cycles plus the fractional cycles of the received CR during a known time period and a phase detector that measures the fractional CR phase of the received CR at an instantaneous time or sampling interval within the known time period to synchronize the receiver's CR phase with the observed or measured CR phase of the received signal.

In certain embodiments, the code tracking module 22 is arranged for generating a control signal, a clock signal, or shifting an adjustable time delay of the locally generated reference CD signal with respect to the digital received signal in response based on maximizing correlation of the received signal to the locally generated reference code signal.

In one embodiment, the tracking module 25 and corresponding code signal generator 24 (e.g., code NCO) and carrier signal generator 28 (e.g., carrier NCO) are collectively adapted to shift an adjustable time delay of one or more locally generated reference signals with respect to the digital received composite signal (or its CD and CR components) in response to control data, measurement data, or both provided by the tracking loop signal processor of the tracking module 25 based on maximizing correlation of the received composite signal (or its code and carrier components) to the locally generated reference signal.

A carrier tracking module 26 facilitates alignment of the phase of the locally generated replica of the CR to the received signal. The carrier tracking module 26 provides control data or a control signal to a carrier numerically controlled oscillator (NCO) module to adjust the locally generated replica signal of the CR produced by carrier NCO module. In one embodiment, the carrier NCO module provides the locally generated replica of the carrier to the carrier wipe-off module 23. The carrier NCO module may receive an input reference clock signal and output an adjusted clock signal or another control signal for generating the locally generated CR frequency that accurately aligns with the CR phase or the residual carrier phase of received sample.

The code tracking module 22 facilitates alignment of the phase of the locally generated PN replica with respect to the received sample. The code tracking module 22 provides control data or a control signal to adjust a code numerically controlled oscillator (NCO) module, where the code NCO module controls the chipping rate of the code signal generator 24. The code tracking module 22, which normally comprises a delay locked loop (DLL), generates a control signal to tune or adjust the chipping rate of code NCO module.

The data demodulator 41 provides satellite navigation data for estimating a range (e.g., distance between a satellite and the antenna 17) or a position (e.g., in two or three dimensional coordinates) of phase center of the antenna 17. The satellite navigation data or other signal information may comprise one or more of the following information that modulates the baseband waveform of the received signal: date, satellite navigation system time, satellite status, orbital data, ephemeris data, almanac, satellite location, and satellite identifier. The data demodulator 41 may use phase shift keying, phase demodulation, pulse width demodulation, amplitude demodulation, quadrature amplitude demodulation, or other demodulation technique that is consistent with the modulation by the modulator at the satellite transmitter.

In one embodiment, the data demodulator 41 outputs a demodulated signal or demodulated encoded data, such as a demodulated digital signal with a quadrature phase component and in-phase component at baseband. The data may comprise one or more following information such as date, satellite navigation system time, satellite status, orbital data, ephemeris data, almanac, satellite location, and satellite identifier.

In one embodiment, the measurement module 161 (e.g., carrier signal generator 28, code signal generator 24 or both) estimates the propagation time between transmission of a satellite signal from a certain satellite to the receiver antenna 17 and converts the propagation time into a distance or range proportional to the speed of light. The measurement module 161 (e.g., carrier signal generator 28, code signal generator 24, or both) determines a range, pseudo-range or estimated range between the receiver antenna 17 and four or more satellites with a reliable signal quality or signal strength based upon one or more of the following: (a) the measured CD phase of each received signal, and (b) the measured CR phase of each received signal. In one embodiment, the measurement module 161, the navigation positioning estimator 30, or the precise position estimator 38 may resolve ambiguities in the measured CR phase of the received signal by searching for a solution that is consistent with one or more of the following: (1) a position estimated from decoding the code portion of the signal, (2) known reference position of the receiver antenna 17, and (3) differential correction data applicable to the received signal. Further, the measurement module 161 may be associated with a wireless receiver (e.g., satellite receiver, mobile transceiver, or cellular transceiver) that receives navigation correction data from a reference satellite navigation receiver to reduce or eliminate sources of bias or error (e.g., certain clock errors or propagation errors) in the CR phase measurements.

In one embodiment, the navigation positioning estimator 30 determines the position estimate of the receiver antenna 17 based on the measured CR phases, estimated ranges of the measurement module 161 and demodulated data. For example, the navigation positioning estimator 30 or the navigation positioning estimator 30 may use ranges from four or more satellites to determine the position, velocity, or acceleration of the antenna 17 of the receiver in two or three dimensions.

In the digital receiver portion 15, the receiver (11 or 111) or its data processing system (29 or 129) may comprise hardware and software instructions. For example, in one illustrative embodiment the hardware comprises a data processor that communicates to a data storage device (e.g., 155), which stores software instructions, via one or more data buses (e.g., 157).

The data processor (e.g., 159) may be coupled to the data storage device (e.g., 155) via one or more data buses (e.g., 157), which support communication between the data processor and the data storage device (e.g., 155). As used herein the, data processor may refer to one or more components or modules of the digital receiver portion 15, including by not limited to any of the following: the carrier wipe-off module 23, the code wipe-off module, the integration-and-dump module, correlator 20, code signal generator 24, carrier signal generator 28, code tracking module 22, carrier tracking module 26, measurement module 161, data demodulator 41, and navigation positioning estimator 30.

In general, the digital receiver portion 15 comprises computer or an electronic data processing system 29 that comprises an electronic data processor, digital logic circuits, multiplexers, multipliers, digital filters, integrators, delay circuits, oscillator, signal generator, PN code sequence generator, registers, shift registers, logic gates, or other hardware. The electronic data processing system (e.g., 129, 29) may support storage, retrieval and execution of software instructions stored in a data storage device (e.g., 155).

In one embodiment, the navigation positioning estimator 30 estimates a position of the receiver antenna 17 or the receiver (11 or 111) based on communication of data between the baseband processing module 18 and the navigation positioning estimator 30. In one embodiment, the navigation positioning estimator 30 comprises one or more of the following: a relative position estimator 32 and a precise position estimator 38. The relative position estimator 32 may estimate the position or change in position (e.g., relative position) of the mobile receiver (or its antenna 17) with respect to an initial reference position, or may derive an estimated absolute position from the relative position. Meanwhile, the optional precise position estimator 38 may estimate the absolute position of the mobile receiver (or its antenna 17). In one example, the precise position estimator 38 comprises a precise point position (PPP) estimator, a wide area differential global navigation satellite system (GNSS) position estimator, where the precise position estimator 38 receives correction data from a correction wireless device 44 (e.g., receiver or transceiver capable of communication with a base station or a wireless satellite communications device).

In alternate embodiments, the precise position estimator can provide one or more of the following data to the relative position estimator 32: (1) an absolute position of the mobile receiver (or its antenna 17), (2) a reference trajectory (or reference points) of the mobile receiver (11 or 111), or (3) bias-related parameters (e.g., then-current, bias-related parameters for storage in or retrieval from the data storage device 155) associated with previous or current precise point position estimates, where bias-related parameters relate to initial position bias of the relative position estimate, atmospheric delay bias, or receiver clock bias.

In one configuration, a controller 40 may communicate data with the relative position estimator 32, the precise position estimator 38, or both. For example, the controller 40 may send command data to initialize or reinitialize the relative position estimator 32, the precise position estimator 38, or both. The controller 40 may also provide an initial reference position from a known landmark or last position of the mobile receiver (11 or 111). For instance, the controller 40 may retrieve the initial reference position from a data storage device 155, such as non-volatile electronic memory. The position quality estimator 42 may determine a position quality estimate or quality indicator of a relative position determined by the relative position estimator 32 and of the precise point position determined by the precise position estimator 38.

In one embodiment, the relative position estimator 32 comprises an initial bias estimator 34, a time-varying tropospheric estimator 36, and a receiver clock bias estimator 27. In one configuration, the relative position estimator 32 or any of the bias estimators may comprise a Kalman filter, a least squares estimator, a weighted least squares estimator, or a predictive filter.

There are two positions of primary interest that result from the position estimation process of the navigation positioning estimator 30: the absolute position and the relative position. First, the absolute position, $x_t$, which is directly comparable to $x_{ref,t}$, can be estimated by the precise position estimator 38 or recovered or determined by the relative position estimator 34. The absolute position at time t is defines as $$x_t \stackrel{def}{=} x_{ref,t0} + x_{bias,t0} + \Delta x_{t,t0} = x_{ref,t} + x_{bias,t0} + \Delta \hat{x}_{t,t0}.$$

Second, the relative position, $\hat{x}_t$, which is a position that can accurately track the net change in position from time t0 but is not necessarily close to $x_t$. The relative position is defined at time t as $$\hat{x}_t \stackrel{def}{=} x_{ref,t0} + \Delta x_{t,t0} = x_{ref,t} + \Delta \hat{x}_{t,t0}.$$

In the context of PPP, the reference trajectory convergence time can be long with large initial errors, meaning that both the terms $x_{bias,t0}$ and $\Delta \hat{x}_{t,t0}$ are non-negligible and must be estimated accordingly. To solve or fully utilize the above equations in the determination or estimation of an absolute or relative position estimate, the navigation positioning estimator 30 or the data processor (which may comprise a predictive filter) must estimate various states (e.g., nine states): (1) relative position $\Delta \hat{x}_{t,t0}$ (e.g., three states), (2), relative clock $\Delta \tilde{d\tau}_{t,t0}$ (e.g., one state), (3) current tropospheric delay $T_t$ (e.g., one state), (4), initial position $x_{bias,t0}$ (e.g., three states), and (5) initial tropospheric delay $T_{t0}$ (e.g., one state). Conceptually, the four initial states are constants while the remaining five states are time-varying. For example, the initial position bias is a constant and the reference trajectory delta position offset is a time-varying function.

The initial position bias estimator 34 can estimate initial position bias. For example, the initial position bias estimator 34 comprises an initial bias compensator for compensating for the estimated initial position bias.

In one embodiment, the atmospheric bias estimator 36 can estimate atmospheric delay bias (e.g., tropospheric delay bias). For example, the atmospheric bias estimator 36 can estimate the temporal change in atmospheric delay bias (e.g., tropospheric delay bias) over time associated with a propagation path for the satellite signal between a particular satellite and a receiver (11 or 111). For instance, the atmospheric bias estimator 36 for estimating atmospheric delay bias comprises an atmospheric bias compensator for compensating for the estimated atmospheric delay bias between the receiver and a respective satellite.

In one embodiment, the optional receiver clock bias estimator 27 can estimate the receiver clock bias over time between the receiver and a respective satellite with respect to a reference time (e.g., Global Positioning System time or GNSS time) or one or more satellite times. For example, the optional receiver clock bias estimator 27 can estimate the temporal change in receiver clock bias over time between the receiver and a respective satellite with respect to a reference time (e.g., Global Positioning System time or GNSS time) or one or more satellite times. The optional receiver clock bias estimator 27 can compensate for the estimated receiver clock bias. In the navigation positioning estimator 30, the relative position estimator 32 may carry out any of the bias compensation for the initial position bias, the atmospheric delay bias and the receiver clock bias in the range domain or the position domain by adjusting the range or position based on phase measurements with an offset or bias compensation.

For certain configurations of the optional precise position estimator 38 of FIG. 1B, there may be an integer ambiguity in the measured or observed number of wavelengths of the carrier signal that are between the receiver (11 or 111) and each satellite; the receiver (11 or 111) or carrier phase measurement module 151 may resolve the integer ambiguities over a convergence period. At the start of a convergence period on the integer ambiguity solution or floating ambiguity value by the precise position estimator 38, the ambiguity may be subject to a high variance or error than is required for precise carrier phase navigation, which is typically within a few centimeters of accuracy. However, the relative position estimator 32 can provide accurate relative position estimates that are independent of the convergence of or the ambiguity resolution of carrier phase measurements of the optional precise position estimator 38 because the solution is independent of the ambiguity terms by virtue of the time differencing. As long as a cycle slip detector (e.g., detector 21 of FIG. 1B) is able to identify a cycle slip for the relative position estimator 32 and to adjust to the entrance and exit of visible satellites within suitable reception range of the receiver, the relative position estimator 34 can provide accurate and precise relative position estimates from initialization and over a long time period (e.g., many epochs or many hours from an initial time, such as initialization of the relative position estimator 32). An epoch means a specific instant in time of a navigation satellite system or the time interval during which the mobile receiver 11 measures the carrier phase or carrier phases of one or more satellites.

The precise position estimator 38 uses correction data received by the correction wireless device 44, where the correction data includes satellite clock and orbit corrections. The relative position estimator 32 can use the same correction data to correct carrier phase measurements to facilitate accurate time-differenced relative positions, even where the time differencing extends over a long time period of many hours or epochs. Without appropriate correction data that contains satellite clock and orbit corrections, the satellite clock errors can grow too quickly or without sufficient control to support time-differencing over long time periods. However, here the relative position estimator 32 is capable of determining temporal satellite clock error changes from the correction data to support accurate and precise time-differencing over long time periods of hours or many epochs. For example, correction data, such as network-based clock corrections can be applied when they are available making this approach workable in practice.

In one embodiment, the navigation positioning estimator 30 may comprise an optional continuity module 45. The optional continuity module 45 is optional as indicated by the dashed lines in FIG. 1B. If the cycle slip detector 21 detects a cycle slip, the navigation positioning estimator 30 or the digital receiver portion 15 removes those measurements (e.g., or that particular satellite's phase measurements) from the relative position estimator 32. The navigation positioning estimator 30 or the digital receiver portion 15 allows the measurements (e.g., phase measurements) for that particular satellite to be used again once the relative position estimator 32 or its continuity module 45 resets or reinitializes to chain together (or to leverage prior relative positions as reference points for) the relative positioning for arbitrarily long time periods. These resets of the relative position estimator 32 will occur periodically to ensure that an adequate number of satellites are used at any instant, but not too often in order to prevent position error drift inherent to the chaining events.

Figure 2A:
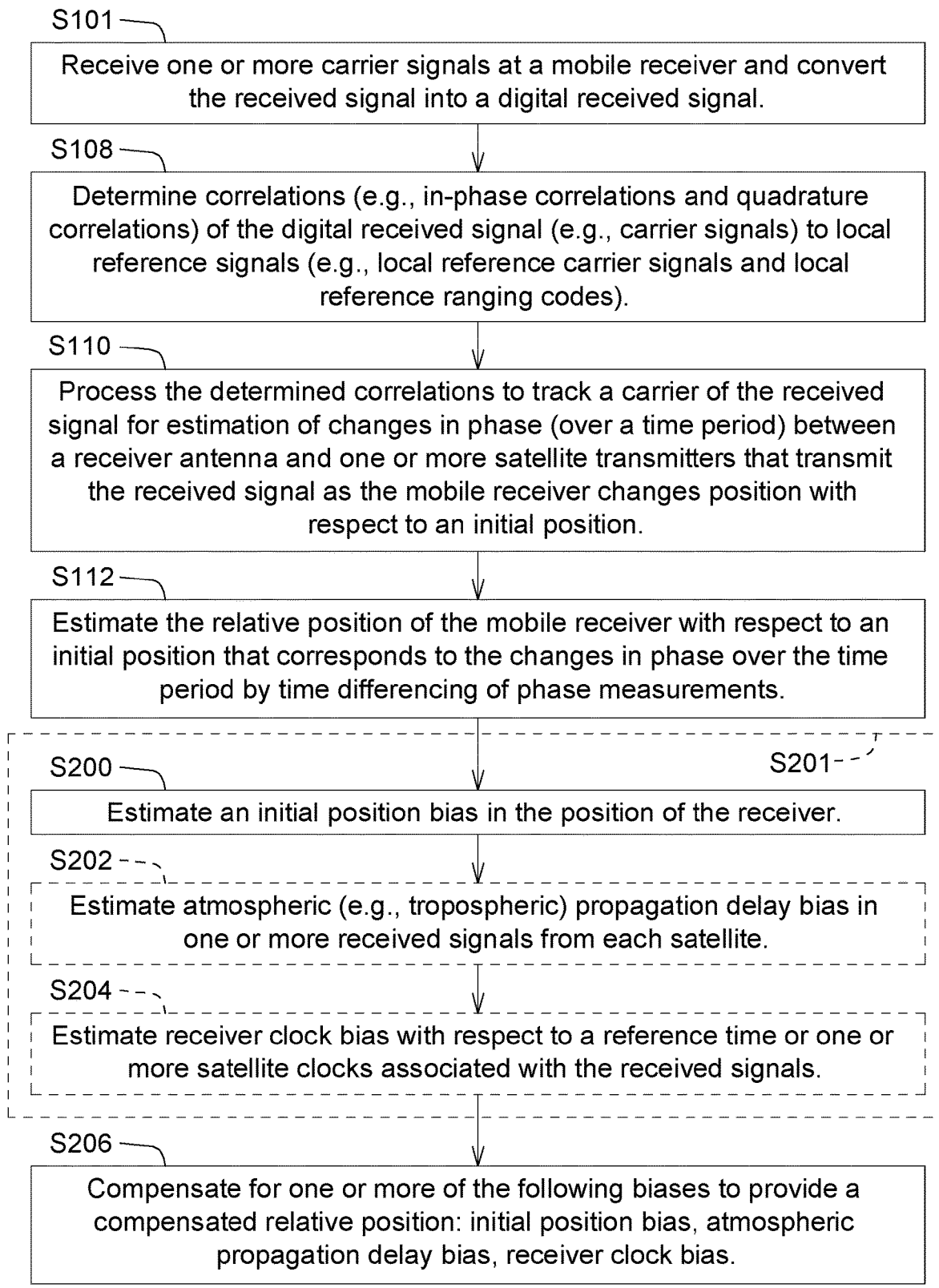
FIG. 2A is a flow chart of a first embodiment of a method for operating a satellite receiver with bias estimation.

FIG. 2A is a flow chart of a first embodiment of a method for operating a satellite receiver with bias estimation or compensation. As used throughout this document, the receiver refers to a satellite navigation receiver, a GNSS receiver, or mobile receiver or a rover. The method of FIG. 1 begins in step S101.

In step S101, a satellite navigation receiver (e.g., receiver or mobile receiver) or a receiver front-end module 10 receives a set of one or more carrier signals from satellite transmitters. For example, the receiver (11 or 111) receives one or more carrier signals at the mobile receiver and converts each received signal into a digital received signal.

In step S108, the receiver (11 or 111), a plurality of correlators 20 or a measurement module 161 determines correlations (e.g., in-phase correlations and quadrature correlations) of each received signal or each carrier signal in the set to a local reference signal. For example, the receiver, a plurality of correlators 20 or a measurement module 161 determines correlations of each received signal (e.g., carrier signal and ranging codes) to local reference carrier signals and local reference ranging codes. In step S108, the baseband processing module 18 or a set of correlators 20 can determine correlations (e.g., in-phase correlations and quadrature correlations) of the digital received signals (e.g., carrier signals and ranging codes) to local reference carrier signals and local reference ranging codes for each satellite within reliable reception range of the mobile receiver (11, 111).

In step S110, the receiver (11, 111) or a tracking module 25 is arranged to process the determined correlations to track one or more carrier signals for estimation of respective changes in phase measurements over time between a receiver antenna 17 and one or more satellite transmitters that transmit the received signal (e.g., one or more carrier signals modulated with one or more PN codes) as the receiver (11, 111) changes position with respect to an initial position. In one example for carrying out step S110, the baseband processing module 18, the tracking module 25 or the carrier tracking module 26 processes the determined correlations to track a carrier of the received signal for estimation of changes in the phase measurements over a time period between a receiver antenna 17 and one or more satellite transmitters that transmit the received signal as the receiver changes position with respect to an initial position.

In another example for carrying out step S110, the baseband processing module 18, the tracking module 25 or the carrier tracking module 26 processes the determined correlations to track respective carrier signals (e.g., L1, L2 and L5 signals) of the received signal for each satellite for estimation of changes in phase measurements over a time period between a receiver antenna 17 and one or more satellite transmitters that transmit the received signal as the receiver changes position with respect to an initial position.

In step S112, the receiver (11 or 111) or the relative position estimator 32 estimates the relative position of the navigation receiver (11 or 111) with respect to an initial position that corresponds to the changes in phase over the time period time by time-differencing of phase measurements of the one or more tracked carrier signals. For example, the relative position estimator 32 or the navigation positioning estimator 30 estimates the relative position of the navigation receiver (11 or 111) by time-differencing of phase measurements of the one or more tracked carrier signals such that $$\hat{x}_t \stackrel{def}{=} x_{ref,t0} + \Delta x_{t,t0}$$

where: $\hat{x}_t$ is the relative position at time t; $x_{ref,t0}$ is the initial (reference) position at time t0; and $\Delta x_{t,t0}$ is the position change from time t0 to time t. In one embodiment, the precise position estimator 38 provides the initial reference position, $x_{ref,t0}$ at time t0, to the relative position estimator 32 or navigation positioning engine. In other embodiments, the precise position estimator 38 can provide correction data (e.g., received by the correction wireless device 44) or bias-related data that can be used by one or more of the following to estimate or compensate for bias in the relative position: initial position bias estimator 34, atmospheric bias estimator 36, or receiver clock bias estimator 27. For example, certain bias-related data (e.g., tropospheric bias data) previously determined by the precise position estimator 38 (e.g., for an earlier epoch) may be stored in data storage device 155 because it remains valid for subsequent initializations or uses of the receiver within a maximum time period (e.g., later epochs after the earlier epoch until the particular bias-related data goes stale). An epoch means a specific instant in time of a navigation satellite system or the time interval during which the mobile receiver 11 measures the carrier phase or carrier phases of one or more satellites.

The relative position estimator 32 and the relative position estimated by the relative position estimator 32 do not require the precise position estimator 38 to reach convergence for the ambiguity solution of integer wavelengths of each carrier signal between the receiver antenna 17 and respective satellite transmitter. Instead, within the relative position estimator 32, any ambiguity term in the integer wavelengths of the carrier signal cancels out of the phase time-differencing observation equations which are used in determination of the relative position. Accordingly, the relative position estimator 32 can provide accurate and precise relative position estimates immediately or shortly after initialization (and independent of ambiguity resolution of the precise point estimator 38).

In one embodiment, in step S201 the receiver or relative position estimator 32 models or estimates one or more biases selected from the group comprising: a bias (e.g., initial position bias) in the initial position of the receiver, a temporal change in receiver clock bias (over time) with respect to a reference time (e.g., satellite system time), or a temporal change in atmospheric propagation delay bias (over time) between a receiver and a respective satellite with respect to a reference time. Step S201 may comprise one or more of the following steps: step S200, step S202 and step S204. Optional steps or procedures are indicated by dashed lines in FIG. 2A.

In certain embodiments, in step S201, or steps S200, S202 and S204, the navigation positioning estimator 30, the relative position estimator or the data processing system may estimate one or more biases in the relative position based on an observed change in carrier phase of the receiver with respect to an initial time and an observation time in accordance with the following equation ("Equation 1"):

$$\Delta\tilde{\varphi}_{t,t0}^i = -e_t^{iT}\Delta x_{t,t0} - \Delta e_{t,t0}^{iT} x_{t0} + \Delta \tilde{d\tau}_{t,t0} + M_t^i T_t - M_{t0}^i T_{t0} + \Delta\varepsilon_{\tilde{\varphi},t,t0}^i, \text{ where:}$$

$\Delta\tilde{\varphi}_{t,t0}^i$ is a time-difference of carrier phase measurements or observations between the mobile receiver and the satellite transmitter of satellite i at times t and t0 (t>t0);

$e_t^i$ is the receiver to satellite line-of-sight vector, $e_t^{iT}$ is the transpose of $e_t^i$, and $\Delta e_{t,t0}^{iT}$ is the change in the transpose of the receiver to satellite line-of-sight vector from time t0 to time t;

$\Delta x_{t,t0}$ is the change in relative position from the initial time, t0, to the observation time, t;

$x_{t0}$ represents the position at time t0, which is a constant;

$\Delta \tilde{d\tau}_{t,t0}$ is the (temporal) change in receiver clock bias from time t0 to time t;

$M_t^i$ is the elevation mapping function (e.g., general or wet mapping function) at time t that maps zenith tropospheric delay to a line-of-sight delay between the mobile receiver and the satellite i;

$T_t$ is the residual zenith tropospheric delay at time t;

$M_{t0}^i$ is the elevation mapping function (e.g., general or wet mapping function) at time t0;

$T_{t0}$ is the residual zenith tropospheric delay at t0; and $\Delta\varepsilon_{\tilde{\varphi},t,t0}^i$ is the difference in carrier-phase observation noise and other unmodeled errors between times t and t0.

In Equation 1, $\Delta \tilde{d\tau}_{t,t0} = \Delta d\tau_{t,t0} + \Delta B_{\varphi,t,t0}$, where $\Delta \tilde{d\tau}_{t,t0}$ is the difference in receiver clock error at times t and t0, and $\Delta d\tau_{t,t0}$ is the receiver satellite clock error that is solely associated with the receiver and satellite clock error terms excluding any frequency-dependent carrier phase bias between the receiver and satellite at times t and t0, and $\Delta B_{\varphi,t,t0}$ is the error or difference in receiver and satellite carrier phase bias from an initial time t0 to an observation time t for a given satellite. $\Delta B_{\varphi,t,t0} = B_{\varphi,t} - B_{\varphi,t0}$, where $\Delta B_{\varphi,t,t0}$ is the error or difference in receiver and satellite carrier phase bias from an initial time t0 to an observation time t for a given satellite, where $B_{\varphi,t}$ is the receiver and satellite carrier phase bias at time t, and $B_{\varphi,t0}$ is the receiver and satellite carrier phase bias at observation time t0.

In an alternate embodiment, Equation 1 can be modified for the combined use of two different GNSS system satellites, such as GPS and GLONASS satellites, or GPS and Galileo satellites, as follows:

$$\Delta \hat{\varphi}_{t,t0}^i = -e_t^{iT} \Delta \hat{x}_{t,t0} - \Delta e_{t,t0}^{iT} x_{bias,t0} + \Delta \widetilde{d\tau}_{t,t0} + \Delta d\tau_{t,t0}^{GLN} + M_t^i T_t - M_{t0}^i T_{t0} + \Delta \varepsilon_{\hat{\varphi},t,t0}^i;$$

where $d\tau_t^{GLN}$ is the inter-system time bias between two GNSS systems (e.g., GPS and GLONASS systems) at any time t; and $\Delta d\tau_{t,t0}^{GLN}$ is a time-differenced inter-system time bias between two GNSS systems (e.g., GPS and GLONASS systems) at times t and t0.

The inter-system time bias, $d\tau_t^{GLN}$, represents an additional state that is necessary to support different satellite constellations, like GPS and GLONASS. $d\tau_t^{GLN}$ is a timing offset to account for the time system differences (e.g., an clock time differences) between different GNSS systems. Here, GPS is treated as the primary constellation and GLONASS satellites are used with reference to the GPS system time. At any time t the difference between GPS and GLONASS system time is given by a term $d\tau_t^{GLN}$ that is not a constant.

In one embodiment where two different types of system (GNSS) satellites are used, the precise position estimator 38 might also optionally provide information about the inter-system clock bias changes with time, which may be used to propagate or predict the term $\Delta d\tau_{t,t0}$ forward in time. This means simply that $\Delta \widetilde{d\tau}_{t+\Delta t, t0} \approx \Delta \widetilde{d\tau}_{t,t0} + (d\tau_{ref,t+\Delta t} - d\tau_{ref,t})$. If present, the same predictive approach may be used for the system time bias states such as $\Delta d\tau_{t,t0}^{GLN}$ mentioned above. That is, $\Delta d\tau_{t+\Delta t, t0}^{GLN} \approx \Delta d\tau_{t,t0}^{GLN} + (d\tau_{ref,t+\Delta t}^{GLN} - d\tau_{ref,t}^{GLN})$.

In step S200, the positioning navigation estimator or the initial position bias estimator 34 estimates the initial position bias, $x_{bias,t0}$, which can be expressed as a change or offset to the initial position, $x_{ref,t0}$ in order to account for the inaccuracy of the latter. In one embodiment, the initial position bias represents the difference between the initial position at the initial time (t0) and the reference trajectory at the initial time (t0), which can be notated as $x_{t0} = x_{ref,t0} + x_{bias,t0}$, where $x_{t0}$ is the initial position, $x_{ref,t0}$ is a reference position at the initial time (t0) that is consistent with the reference trajectory of the receiver, and $x_{bias,t0}$ is the initial position bias.

Reference trajectory means a time series of one or more reference positions. The reference trajectory can be provided by the precise position estimator 38, although in other embodiments other data sources (e.g., other position estimators) of a time series of reference positions could be used. Each reference position (or its corresponding bias-related data) of the receiver or precise position estimator 38 at time zero or t0 (e.g., $x_{ref,t0}$), or a reference position at another time (e.g., $x_{ref,t}$) can aid, augment or enhance the accuracy of the relative position estimator 32. For example, the relative position estimator 32 may align, fuse or tie the relative position estimate to the precise position estimate with or without weighting of the respective relative and precise position estimates, when available or after convergence upon an integer ambiguity solution. The reference position or reference trajectory may be based on the output of a precise position estimator 38 that is available at t0 or another time as an input to the relative position estimator 32.

In step S200, the receiver (11 or 111) or relative position estimator 32 models or estimates an initial position bias in the position of the receiver. The initial position bias ($x_{bias,t0}$) is at the initial time, or at the time of initialization, of the relative position estimator 32 of the receiver (11 or 111). In one embodiment, the relative position estimator 32 comprises a predictive filter. Accordingly, in executing step S200 the relative position estimator can determine the initial position bias, indirectly via a predictive filter, such as a Kalman filter or a modified Kalman filter. Because observability of states (of the predictive filter or Kalman filter) may be problematic in practice, one embodiment includes artificial or constraint measurements that tie the relative position estimator 32 to the precise point estimator 38. The purpose of the position constraint measurements is to ensure the absolute position state of the relative position estimator 32 matches loosely, to a specified degree, the absolute position state from the precise position estimator 38 ($x_{bias,t0} + \Delta \hat{x}_{t,t0} \approx 0$).

In step S202, the receiver (11 or 111) or relative position estimator 32 models or estimates one or more of the following: (1) the atmospheric propagation delay bias (e.g., tropospheric propagation delay bias) over time associated with a signal propagation path between a receiver and a respective satellite, or (2) the temporal change in atmospheric propagation delay bias (e.g., tropospheric propagation delay bias) over time associated with a signal propagation path between a receiver and a respective satellite. For example, in step S202, the time-varying tropospheric estimator 36, the relative position estimator 32, or the navigation position estimator 30 estimates a temporal change in atmospheric or tropospheric error over a time interval of multiple epochs or an arbitrarily long term to provide the compensated relative position. In certain embodiments, the time interval (or arbitrarily long term) may range from approximately fifteen minutes to virtually any number of hours or continuous hours. In one embodiment, the tropospheric delay bias may be modeled as an initial static bias component and a time-varying component, although other models of atmospheric delay bias are possible.

Step S202 may be carried out in accordance with various techniques that may be applied individually or cumulatively. Under a first technique for carrying out step S202, the atmospheric bias estimator 36 estimates atmospheric delay or atmospheric delay bias based on or equal to tropospheric zenith delay $T_t$ and initial tropospheric zenith delay $T_{t0}$ multiplied by the respective mapping functions (e.g., wet mapping functions or elevation mapping functions).

Under a second technique, the atmospheric bias estimator 36 utilizes constraint measurements that tie the relative position estimator's estimate of tropospheric delay to that of the precise position estimator 38 so that with a given error variance $T_t - T_{ref,t} \approx 0$. As previously noted, the precise position estimator 38 may provide then-current estimates of bias-related data, such as atmospheric delay bias or tropospheric delay bias (e.g., static or time-varying components), to the relative position estimator 34, or its atmospheric bias estimator 36.

Under a third technique for carrying out step S202, the atmospheric bias estimator 36 determines or estimates a temporal change in tropospheric delay bias over a time period (e.g., between an initial time and an observation time) between the receiver and each satellite (within view or reliable reception range) based on current (e.g., wet) tropospheric delay $T_t$ and initial (e.g., wet) tropospheric delay $T_{t0}$ and mapping (e.g., wet mapping) functions.

Under a fourth technique for carrying out step S202, the atmospheric bias estimator 36 or navigation positioning estimator 30 uses a constraint approach to estimate the tropospheric delay (or associated temporal change in tropospheric delay over time) to ensure some consistency with the estimates of the absolute estimator (e.g., precise position estimator 38) with the relative position estimator 34 described in this disclosure ($T_t \approx T_{ref,t}$). That is, the precise position estimator 38 can provide bias-related data on the atmospheric delay, such as $T_{ref,t}$ to be used (e.g., as guidance for $T_t$) by the relative position estimator 34 or the atmospheric bias estimator 36. Tropospheric delay is often difficult to estimate accurately in practice, such that the above constraint can be supportive of accurate position estimation.

The foregoing constraint measurements have the benefit of driving the relative position of the relative position estimator 32 towards the accurate, steady-state PPP solution of the precise position estimator 38. The relative position estimator 32 might also optionally provide additional measurement corrections not easily computed or estimated by the relative position estimator 32, such as an azimuthal dependent correction to the tropospheric delay.

As indicated above, the time varying tropospheric estimator 36 accounts for the current tropospheric delay (time t) as well as the tropospheric delay at the initial time (t0). For example, the compensator 36 can estimate two terms, $T_{t0}$ and $T_t$ that represent zenith tropospheric delays at t0 and t, respectively. In an alternate embodiment, equivalently the time varying tropospheric estimator 36 may estimate $T_{t0}$ and $T_{dt}$, where $T_{dt} = T_t - T_{t0}$, which is the temporal change in tropospheric delay.

In general for step S202, the navigation positioning estimator 30 or atmospheric (delay) bias estimator 36 determines or estimates the tropospheric delay related terms, such as residual zenith tropospheric delay terms (e.g., residual zenith tropospheric delay terms), $T_t$ and $T_{t0}$. Elevation mapping function terms (e.g., elevation wet mapping function), $M_t^i$, $M_{t0}^i$, are established in accordance with a model that depends upon correction data, or delay factor data such as the position of the receiver, the respective position (e.g., azimuth or elevation angle) of the satellite i with respect to the receiver, and atmospheric conditions at the time of day in which the carrier signal propagates, among other things. In GPS, tropospheric delay tends to affect the L1 signal frequency and the L2 signal frequency equally. The delay depends upon the tropospheric refractive index, which varies based on local atmospheric temperature, local atmospheric pressure, and local relative humidity in the propagation path between the particular satellite and the receiver. The elevation mapping function or wet mapping function takes into consideration the impact of water vapor on the refractive index.

The atmospheric delay in the carrier signal or refractive index may vary as a function of the height of the receiver (11 or 111), such as height above sea level, and the elevation angle between the receiver and satellite. For example, $M_t^i = M(E_t^i)$, where $E_t^i$ is the elevation angle from the receiver to satellite (i) at observation time t and where $M(\cdot)$ is the general elevation mapping function that maps zenith tropospheric delay to the line-of-sight, including applicable wet and dry components of the mapping function in accordance with the applicable model of the atmospheric delay or tropospheric refractive index.

In one embodiment, the atmospheric (delay) bias estimator 36 determines atmospheric delay or tropospheric delay parameters, $T_t$ and $T_{t0}$; the atmospheric (delay) bias estimator 36 or relative position estimator 32 can compensate for the propagation delay between each satellite i and the corresponding receiver, 11 or 111, (e.g., mobile receiver or rover) such that the relative position estimator 32 provides a compensated position that compensates for that portion of the observed time-differenced carrier phase measurement that is associated with atmospheric propagation delay. That is, that portion of $\Delta\tilde{\varphi}_{t,t0}^i$, the time-differenced carrier phase measurement, that is associated with tropospheric delay parameters $T_t$ and $T_{t0}$ for a particular satellite i.

In step S204, the receiver or relative position estimator 32 models or estimates one or more of the following: (1) receiver clock bias (over time) with respect to a reference time or one or more satellite clocks, and (2) a temporal change in receiver clock bias (over time) with respect to a reference time or one or more satellite clocks. In one embodiment, the receiver clock bias estimator 27 may absorb a frequency-dependent time error that comprises a receiver and satellite carrier phase bias in the estimate of receiver clock bias. As previously referenced in conjunction with Equation 1, the receiver and satellite carrier phase bias can be expressed as:

$\Delta B_{\varphi,t,t0} = B_{\varphi,t} - B_{\varphi,t0}$, where $\Delta B_{\varphi,t,t0}$ is the error or difference in receiver and satellite carrier phase bias from an initial time t0 to an observation time t for a given satellite, where $B_{\varphi,t}$ is the receiver and satellite carrier phase bias at time t, and $B_{\varphi,t0}$ is the receiver and satellite carrier phase bias at observation time t0.

The relative position estimator 34 or the receiver clock bias estimator 27 can absorb the error in the receiver and satellite carrier phase bias into the receiver clock bias estimate as follows:

$\Delta \tilde{d\tau}_{t,t0} = \Delta d\tau_{t,t0} + \Delta B_{\varphi,t,t0}$, where $\Delta \tilde{d\tau}_{t,t0}$ is the difference in receiver clock error at times t and t0, and $\Delta d\tau_{t,t0}$ is the receiver satellite clock error that is solely associated with the receiver and satellite clock error terms excluding any frequency-dependent carrier phase bias between the receiver and satellite at times t and t0, and $\Delta B_{\varphi,t,t0}$ is the error or difference in receiver and satellite carrier phase bias from an initial time t0 to an observation time t for a given satellite.

In step S204, the navigation positioning estimator 30 or receiver clock bias estimator 27 determines or estimates the clock bias term $\Delta \tilde{d\tau}_{t,t0}$ (or alternately, $\Delta d\tau_{t,t0}$, where $\Delta \tilde{d\tau}_{t,t0}$ is not available) with respect to a receiver and corresponding satellite i. The receiver clock bias estimator 27 or relative position estimator 32 can compensate for the clock bias or clock error between each satellite i and the corresponding receiver (e.g., mobile receiver or rover) such that the relative position estimator 32 provides a compensated position that compensates for that portion of the observed time-differenced carrier phase measurement that is associated with clock bias with respect to a particular satellite or a satellite system time reference (e.g., Global Positioning System (GPS)) time. That is, that portion of $\Delta\tilde{\varphi}_{t,t0}^i$, the time-differenced carrier phase measurement, that is associated with clock bias term $\Delta \tilde{d\tau}_{t,t0}$ for a particular satellite i.

In step S206, the receiver or relative position estimator 32 can compensate for one or more of the biases to provide a compensated relative position of the receiver (e.g., or to derive an absolute position in certain embodiments). For example, the estimated position or compensated relative position of the receiver reflects the position of the receiver antenna or the phase center of the receiver antenna 17 in accordance with Equation 1.

Figure 2B:
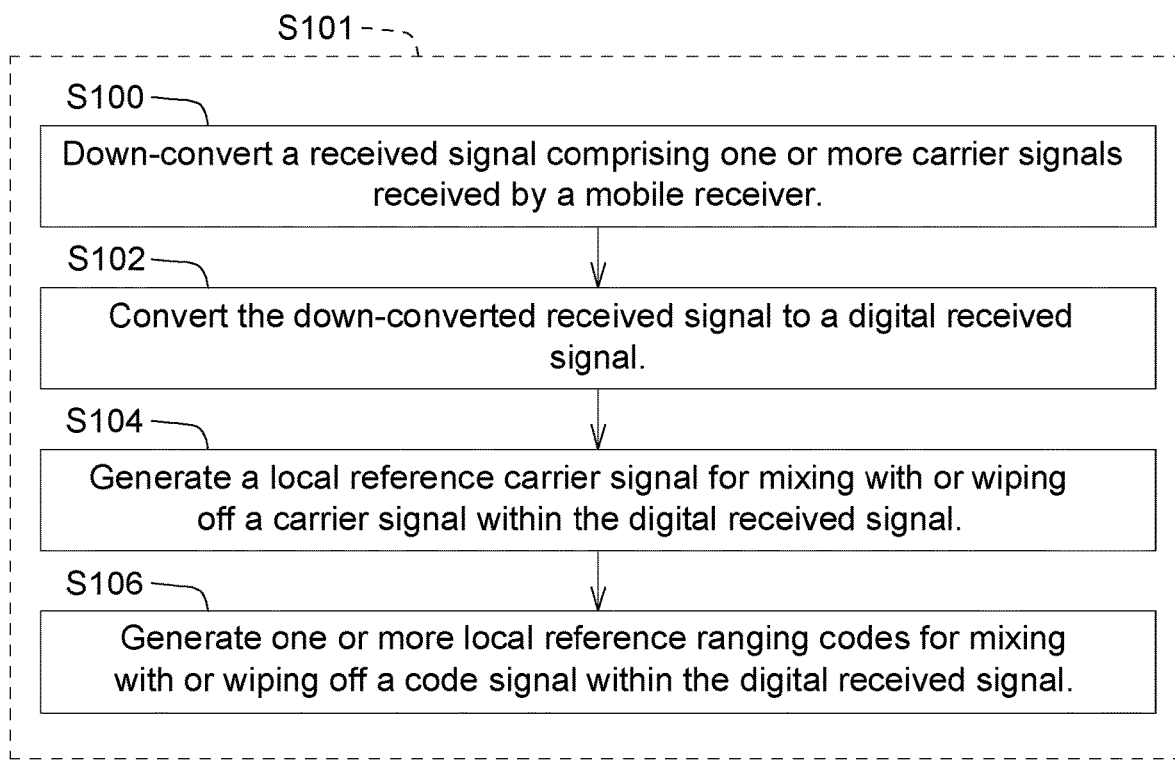
FIG. 2B is a flow chart of a second embodiment of a method for operating a satellite receiver with bias estimation.

FIG. 2B is a flow chart of a second embodiment for operating a satellite receiver with bias estimation or compensation. The method of FIG. 2B provides an illustrative example of executing step S101 with a series of possible steps, procedures or sub-steps. The method of FIG. 2B begins in step S100 (of FIG. 2A).

In step S100, a down-converter, an RF front end 12 or a receiver front-end module 10 down-converts a received signal comprising one or more carrier signals to an intermediate frequency signal or baseband signal. In one embodiment, the received signal may comprise a Global Positioning System (GPS) received signal that comprises a first carrier signal (e.g., L1 carrier signal), a second carrier signal (e.g., L2 carrier signal) and an optional third carrier signal (e.g., L5 carrier signal) for each satellite transmitter that transmits the received signal and is within reliable communications range of the mobile receiver. In other embodiments, the received signal may comprise any global navigation satellite system signal that is received from one or more satellites, such as a (Global Navigation Satellite System) GLONASS, Galileo or another global navigation satellite system. The down-converted signal comprises an analog intermediate frequency signal or a baseband received signal that is lower in frequency than the received signal, but that still contains the same encoded information as the received signal.

In step S102, the analog-to-digital converter 14 or the receiver front-end module 10 converts the down-converted received signal to a digital received signal. For example, the digital received signal is at a baseband frequency or an intermediate frequency.

In step S104, the baseband processing module 18 or the carrier signal generator 28 generates a local reference carrier signal for mixing with or wiping off a carrier signal within the digital received signal. For example, the baseband processing module 18 or the carrier signal generator 28 may generate local reference carrier signals for mixing with or wiping off respective carrier signals (e.g., L1, L2, and L5 carrier signals) within the digital received signal for each satellite.

In step S106, the baseband processing module 18 or the code signal generator 24 generates one or more local reference ranging codes for mixing with or wiping off a code signal within the digital received signal. For example, the baseband processing module 18 or the code signal generator 24 may generate local reference ranging code signals for mixing with or wiping off respective ranging code signals (e.g., L1, L2, and L5 carrier signals) within the digital received signal for each satellite.

After step S101 or S106, the method of FIG. 2B may continue with step S108 of FIG. 2A, for instance.

Figure 3:
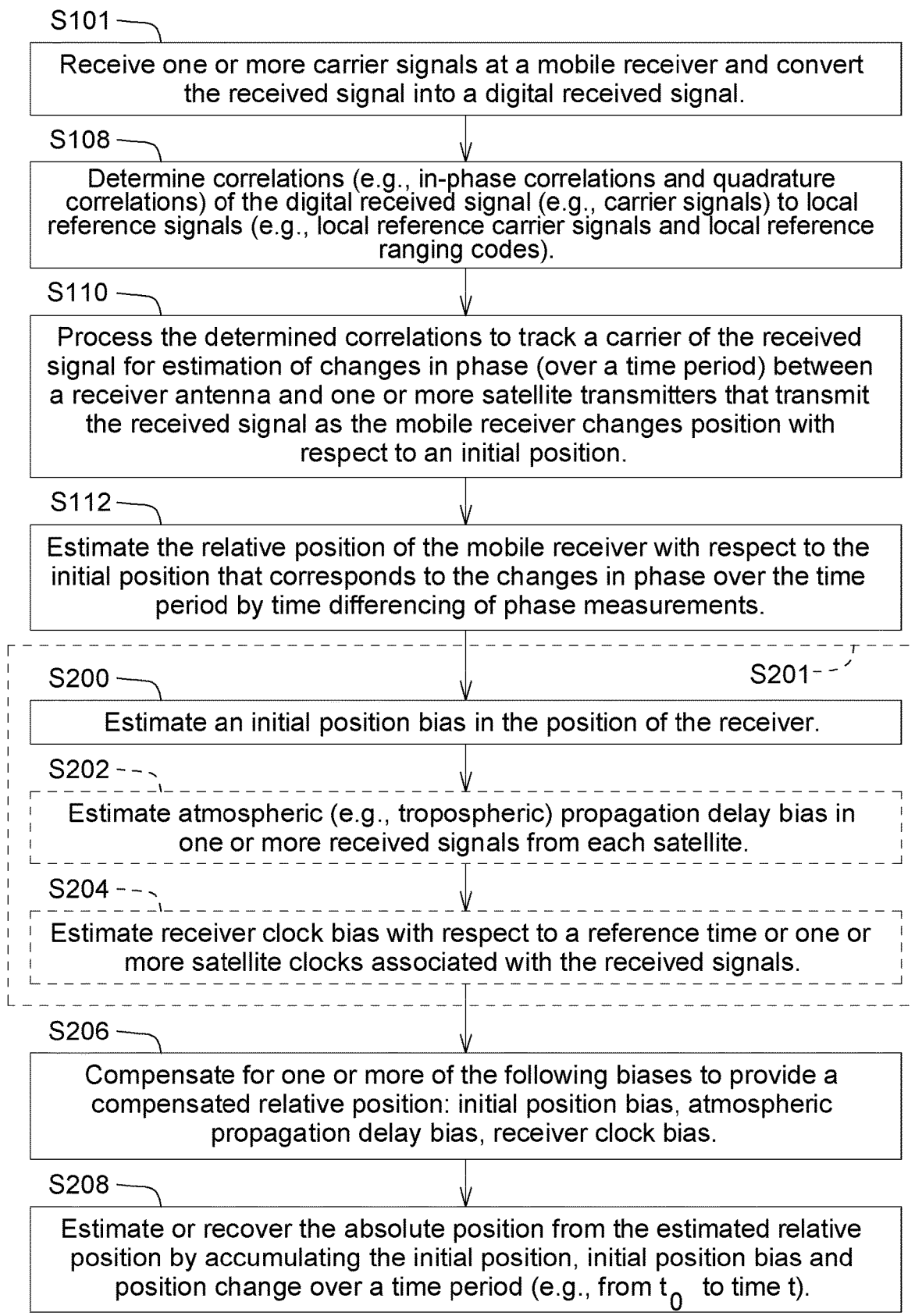
FIG. 3 is a flow chart of a third embodiment of a method for operating a satellite receiver with bias estimation.

FIG. 3 is a flow chart of a third embodiment of a method for operating a satellite receiver with bias estimation or bias compensation. The method of FIG. 3 is similar to the method of FIG. 2A, except the method of FIG. 3 adds step S208. Like reference numbers in FIG. 2A and FIG. 3 indicate like steps, or procedures.

In step S208, the navigation positioning estimator 30 or the relative position estimator 32 estimates or recovers the absolute position from the estimated relative position by accumulating the initial position, the initial position bias and the position change over a time period (e.g., from time t0 to time t).

Step S208 can be carried out in accordance with various techniques, which may be applied separately or cumulatively. Under a first technique for carrying out step S208, the relative position estimator 32 can recover or estimate the absolute position $x_t$ by accumulating the initial position, the initial position bias, and position change terms as $$x_t \stackrel{def}{=} x_{ref,t0} + x_{bias,t0} + \Delta x_{t,t0} = \hat{x}_t + x_{bias,t0},$$

where $x_t$ is the absolute position at time t, $x_{ref,t0}$ is the initial position at time t0 (e.g., provided as a reference initial position consistent with the reference trajectory of the PPP estimator 38), where $\Delta x_{t,t0}$ is the position change (or relative position vector) from time t0 to time t, and where $\hat{x}_t$ is the estimated relative position (at time t).

Under a second technique, a precise position estimator 38 determines a precise position estimate based on carrier phase measurements of the received carrier signal. Further, the precise position estimator 38 runs simultaneously with the relative position estimator 32 and the precise position estimator 38 determines a reference trajectory or reference points consistent with the receiver path over a time period.

Under a third technique for executing step S208, the relative position at time t is estimated by the relative position estimator 32, where the relative position, $\hat{x}_t$ at time t is defined as $$\hat{x}_t \stackrel{def}{=} x_{ref,t0} + \Delta x_{t,t0} = x_{ref,t} + \Delta \hat{x}_{t,t0},$$

where:
$x_{ref,t0}$ is the position of a path of the mobile receiver along a reference trajectory at time t0;
$x_{ref,t}$ is the position of a path of the mobile receiver along a reference trajectory at time t;
$\Delta x_{t,t0}$ is the change in position (or relative position vector) from the initial time, t0, to the observation time, t; and
$\Delta \hat{x}_{t,t0}$ is the change in reference trajectory position offset from the initial time, t0, to the observation time, t.

Figure 4:
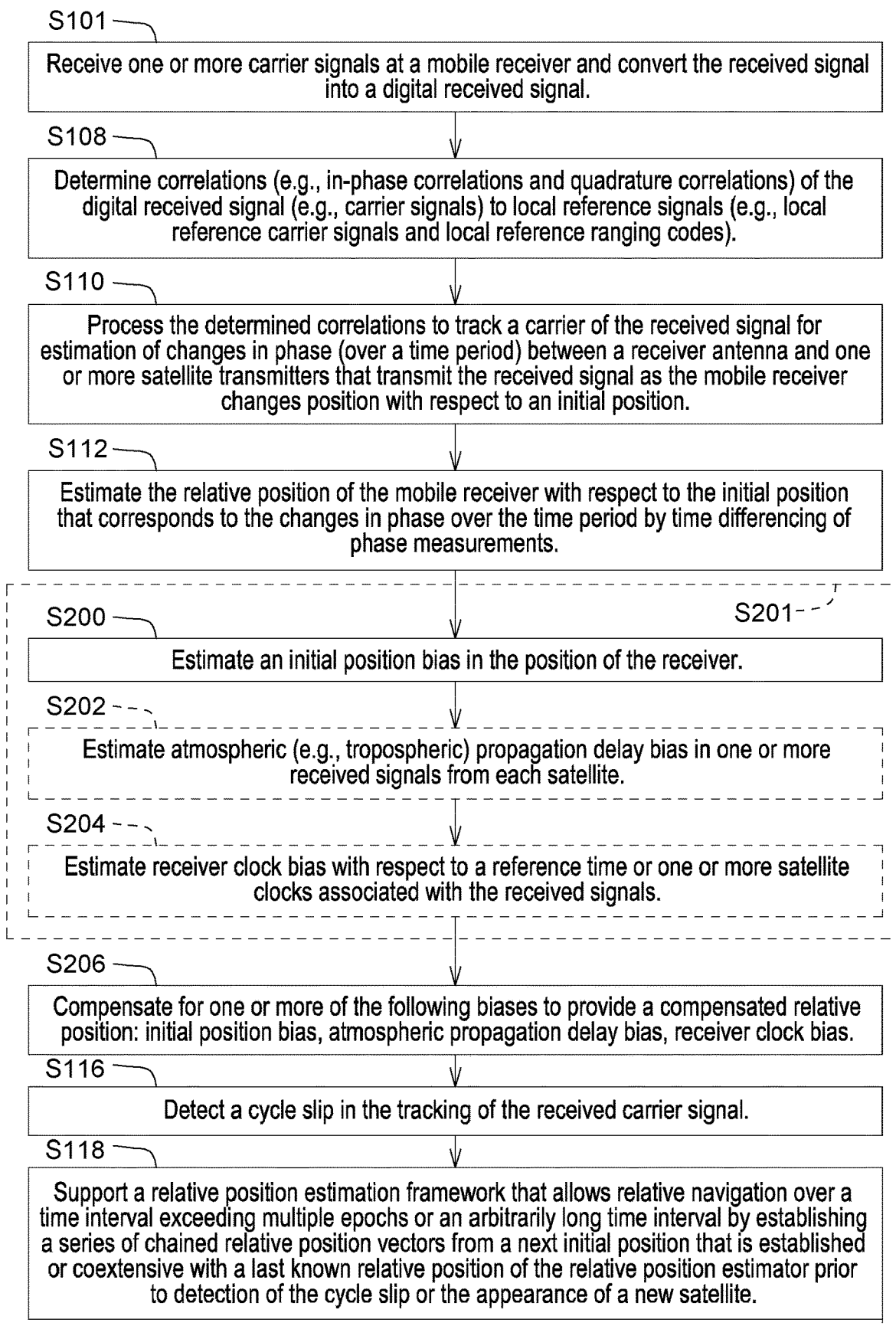
FIG. 4 is a flow chart of a fourth embodiment of a method for operating a satellite receiver with bias estimation.

FIG. 4 is a flow chart of a fourth embodiment of a method for operating a satellite receiver with bias estimation or bias compensation. The method of FIG. 4 is similar to the method of FIG. 2A, except the method of FIG. 4 adds step S116 and step S118. Like reference numbers in FIG. 2 and FIG. 4 indicate like steps, or procedures.

In step S116, a baseband processing module 18, a digital receiver portion 15, or a cycle slip detector 21 detects a cycle slip in the tracking of the received carrier signal.

In step S118, the continuity module 45, the digital receiver portion 15, or the relative position estimator 32 supports a relative position estimation framework that allows relative navigation over a time interval exceeding multiple epochs or an arbitrarily long time interval by establishing a series of chained relative position vectors (or chained relative positions) from a next initial position that is established or coextensive with a last known relative position of the relative position estimator 32 prior to detection of the cycle slip or an appearance of a new satellite. The previous definitions of epoch and the time interval, which were previously set forth in this document, apply equally here.

In one embodiment, in step S118, the continuity module 45, the navigation positioning estimator 30, or the data processing system maintains the accuracy of the relative position in the face of cycle slips and transitions in satellites that are within reception range of the receiver. Naturally over time satellites go below the horizon or fall out of view, and likewise new satellites come into view or reliable reception range. The continuity module 45 allows the receiver to track transitions between different satellites in view and to adjust errors accordingly.

Step S118 may be carried out in accordance with various techniques, which may be applied individually or cumulatively. Under a first technique, in one embodiment of step S118, the continuity module 45, the navigation positioning estimator 30 or the data processing system adjusts carrier phase measurements (e.g., in the range domain or position domain) by a chaining correction factor based on an estimated position change (vector) dot-product multiplied by the transpose of the receiver to satellite line-of-sight vector (e.g., $e_t^{iT}$ is the transpose of the receiver to satellite line-of-site vector) for a corresponding satellite.

Under a second technique, the continuity module 45, the navigation positioning estimator 30 or the relative position estimator 32 comprises a mechanism or software instructions for updating the reference initial position $x_{ref,t0}$ to a new reference initial position $\bar{x}_{ref,t0'}$ at time t0'>t0 such that $$\bar{x}_{ref,t0'} \overset{def}{=} x_{ref,t0} + \Delta x_{t0',t0},$$

where time t0' is a transition time associated with the last known relative position for the series of a chained relative position vectors, where $x_{ref,t0}$ is the reference initial position at time t0, and where $\Delta x_{t0',t0}$; is the position change (or relative position vector) from time t0 to time t0'. Further, the continuity module 45, the navigation positioning estimator 30 or the relative position estimator 32 adjusts observation equations to account for changes in the reference initial position at time t0 by subtracting the vector dot product, $-e_t^{iT} \Delta \hat{x}_{t0',t0}$, from carrier measurements such that the initial position bias at t0, $x_{bias,t0}$, retains its original meaning in subsequent relative position vectors (or subsequent relative positions) after the initial relative position vector (associated with the reference initial position, at time t0, and an estimated relative position at time t). Accordingly, continuity module 45, the navigation positioning estimator 30, or the relative position estimator 32 can subsequently recover the estimated relative position as $\hat{x}_t = \bar{x}_{ref,t0'} + \Delta \hat{x}_{t,t0'}$, where $\hat{x}_t$ is the estimated relative position from time 0 to t, where $\bar{x}_{ref,t0'}$, is the measured initial position at time t0', where $\Delta \hat{x}_{t,t0}$, is the estimated position change from time t0' to time t, where $-e_t^i$ is the receiver to satellite line-of-sight vector, and $e_t^{iT}$ is the transpose of the receiver to satellite line-of-site vector.

Under a third technique, the navigation positioning estimator 30, or relative position estimator 32 recovers its absolute position as $x_t = \hat{x}_t + x_{bias,t0}$, where $x_t$ is the relative position at time t, where $\hat{x}_t$ is the estimated relative position $\hat{x}_t$ from at time t, and where $x_{bias,t0}$ is the initial position bias at t0. As indicated previously, the first second, and third techniques for executing step S118 can be applied together, separately, or in any combination with each other.

Figure 5:
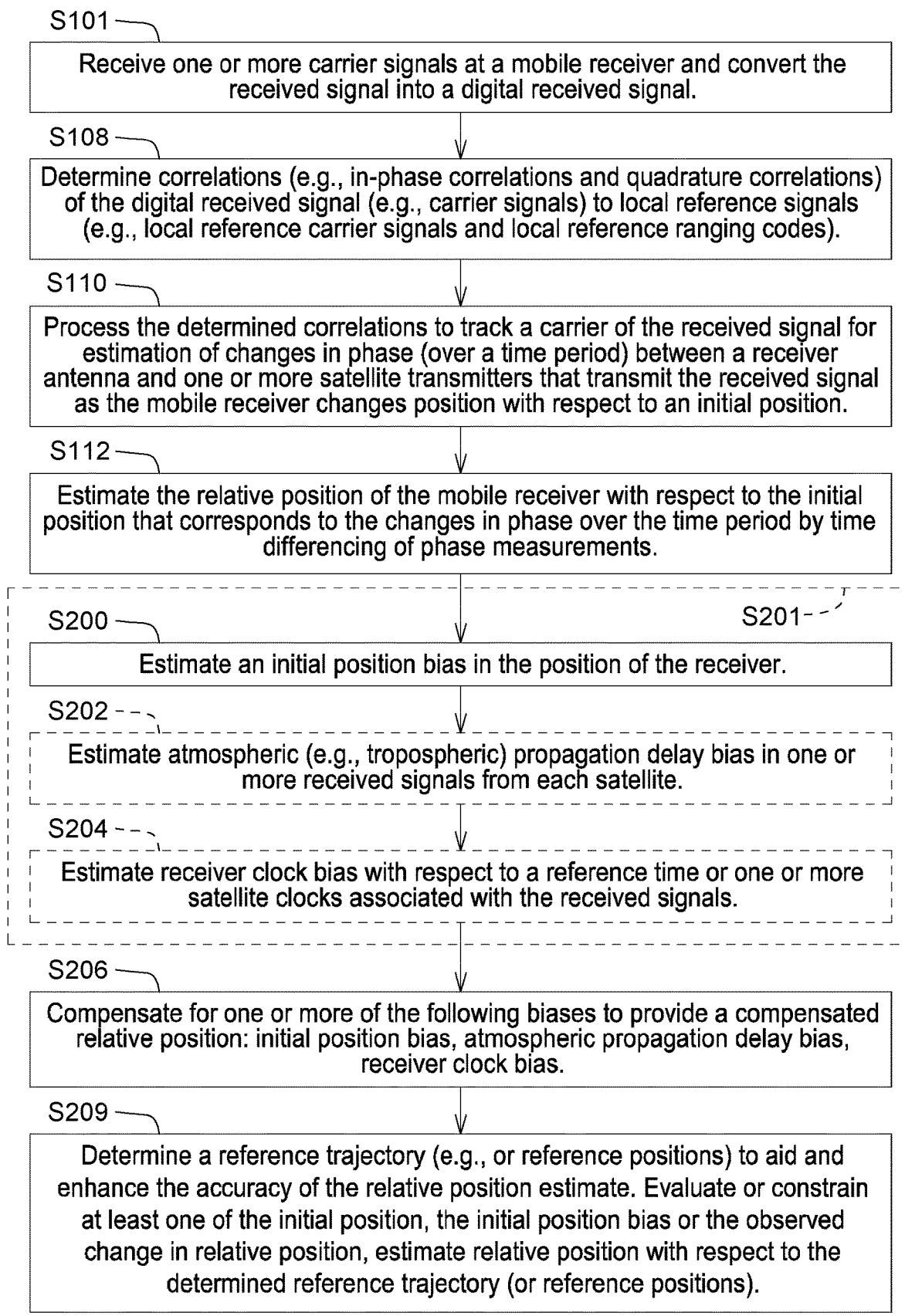
FIG. 5 is a flow chart of a fifth embodiment of a method for operating a satellite receiver with bias estimation.

FIG. 5 is a flow chart of a fifth embodiment of a method for operating a satellite receiver with initial bias estimation or compensation. The method of FIG. 5 is similar to the method of FIG. 2A, except the method of FIG. 5 further comprises step S209. Like reference numbers in FIG. 2A and FIG. 5 indicate like steps, or procedures.

In step S209, the data processor, precise position estimator 38, or navigation positioning estimator 30 provides, determines or obtains a reference trajectory (e.g., or reference points on the trajectory) to aid and enhance the accuracy of the relative position estimate. For example, the precise position estimator 38 or another data source provides a reference trajectory, or reference position points consistent with the reference trajectory, to aid and enhance the accuracy of the relative position estimate.

In an alternate embodiment of step S209, the data processor, controller 40 or navigation positioning estimator 30 evaluates or constrains at least one of the initial position, the initial position bias, the observed change in relative position, or the estimated relative position with respect to the determined reference trajectory or determined reference points consistent with the determined reference trajectory.

In one configuration, the precise position estimator 38 provides an absolute position estimate, a reference trajectory, or bias-related data in accordance with the following equation ("Equation 2"):

$$\varphi_t^i = r_t^i + c(d\tau_t - dT_t^i) + Q_t^i - I_t^i + \lambda N^i + A_t^i - a_t^i + W_t^i - w_t^i + B_{\varphi,t} - b_{\varphi,t}^i + \varepsilon_{\varphi,t}^i, \text{ where}$$

$\varphi_t^i$ is the carrier-phase measurements;
$r_t^i$ is the range from receiver antenna to satellite antenna;
c is the speed-of-light
$d\tau_t$, $dT_t^i$ is the receiver and satellite clock error, respectively;
$Q_t^i$ is tropospheric range delay;
$I_t^i$ is the ionospheric range delay (e.g., frequency dependent atmospheric delay);
$N^i$ is carrier-phase integer ambiguity;
$A_t^i$, $a_t^i$ is the receiver and satellite combined antenna phase center offset and variation, respectively;
$W_t^i$, $w_t^i$ is the receiver and satellite antenna phase center wind-up, respectively;
$B_{\varphi,t}$, $b_{\varphi,t}^i$ is the receiver and satellite carrier phase bias (frequency dependent), respectively
$\varepsilon_{\varphi,t}^i$, $\varepsilon_{\rho,t}^i$ is the carrier-phase observation noise and other unmodeled errors (e.g. multipath), respectively.

In another configuration, the precise position estimator 38 provides an absolute position estimate, a reference trajectory, or bias-related data in accordance with the following equation ("Equation 3"), which uses known satellite positions associated with orbital information and tropospheric delay models:

$$\tilde{\varphi}_t^i = -e_t^{iT} x_t + d\tau_t + M(E_t^i) T_t + B_{\varphi,t} - b_{\varphi,t}^i + \tilde{\lambda} \tilde{N}^i + \varepsilon_{\tilde{\varphi},t}^i, \text{ where}$$

$\tilde{\varphi}_t^i$ are the carrier phase observations or measurements;
$x_t$ is the receiver position; $r_t^i = x_t^{SV_i} - x_t$ based on satellite vehicle position $x_t^{SV_i}$ of satellite i at time t, $r_t^i$ is the line-of-site vector between the satellite and receiver at time t;
$e_t^i$ is the receiver to satellite line-of-sight vector, $e_t^i = r_t^i / \|r_t^i\|$;
$T_t$ is the residual zenith tropospheric delay;
$E_t^i$ is the elevation angle from the receiver to satellite;
M(•) is the elevation mapping function (e.g., elevation wet mapping function) that maps zenith tropospheric delay to the line-of-sight;
$\tilde{\lambda}$ is the wavelength of the ionosphere-free observation combination;
$\tilde{N}^i$ is the carrier-phase integer ambiguity for the ionospheric free measurement combination; and
$\varepsilon_{\tilde{\varphi},t}^i$ is the carrier-phase observation noise and other unmodeled errors for the ionosphere-free observation combination.

If the PPP position estimates are estimated by the precise position point estimator 38, such as in accordance with Equation 2 or Equation 3 in step S209, the relative position estimator 34 can determine a relative position estimate that is linearized about the above PPP position estimates in the following Equation 4:

$$\Delta \hat{\varphi}_{t,t0}^i = -e_t^{iT} \Delta \hat{x}_{t,t0} - \Delta e_{t,t0}^{iT} x_{bias,t0} + \Delta \widetilde{d\tau}_{t,t0} + M_t^i T_t - M_{t0}^i T_{t0} + \Delta \varepsilon_{\tilde{\varphi},t,t0}^i, \text{ where}$$

$$\Delta \hat{\varphi}_{t,t0}^i + e_t^{iT}(x_{ref,t} - x_{ref,t0}) + \Delta e_{t,t0}^{iT} x_{ref,t0} = \Delta \hat{\varphi}_{t,t0}^i;$$

$\Delta \hat{\varphi}_{t,t0}^i$ is a time-difference of carrier phase measurements or observations between the mobile receiver and the satellite transmitter of satellite i at times t and t0 (t>t0) that is linearized about the reference trajectory of the precise position estimator 34;

$e_t^i$ is the receiver to satellite line-of-sight vector, $e_t^{iT}$ is the transpose of $e_t^i$, and $\Delta e_{t,t0}^{iT}$ is the change in the transpose of the receiver to satellite line-of-sight vector from time t0 to time t;

$\Delta \hat{x}_{t,t0}$ is the reference trajectory delta-position offset;

$\Delta \widetilde{d\tau}_{t,t0}$ is the difference in receiver clock error at times t and t0;

$M_t^i$ is the elevation mapping function (e.g., general or wet mapping function) at time t that maps zenith tropospheric delay to a line-of-sight delay between the mobile receiver and the satellite i;

$T_t$ is the residual zenith tropospheric delay at time t;

$M_{t0}^i$ is the elevation mapping function (e.g., general or wet mapping function) at time t0;

$T_{t0}$ is the residual zenith tropospheric delay at t0;

$\Delta \varepsilon_{\widetilde{\varphi},t,t0}^i$ is the difference in carrier-phase observation noise and other unmodeled errors between times t and t0;

$x_{bias,t0}$ is the bias of reference trajectory estimate at time t0;

$x_{ref,t0}$ is the position along the reference trajectory at time t0, $x_{ref,t}$ is the position along the reference trajectory at time t, $x_{t0}=x_{ref,t0}+x_{bias,t0}$, where $x_{t0}$ is the position at time t0, where $x_{ref,t0}$ is the position along the reference trajectory at time t0, and where $x_{bias,t0}$ is the initial position bias of the reference trajectory at time t0;

$\Delta \hat{x}_{t,t0}$, where $\Delta \hat{x}_{t,t0}$ is the reference trajectory delta-position offset; and $\Delta x_{t,t0}=(x_{ref,t}-x_{ref,t0})+\Delta \hat{x}_{t,t0}$, where $\Delta x_{t,t0}$ is the delta-position from time t0 to time t.

Figure 6:
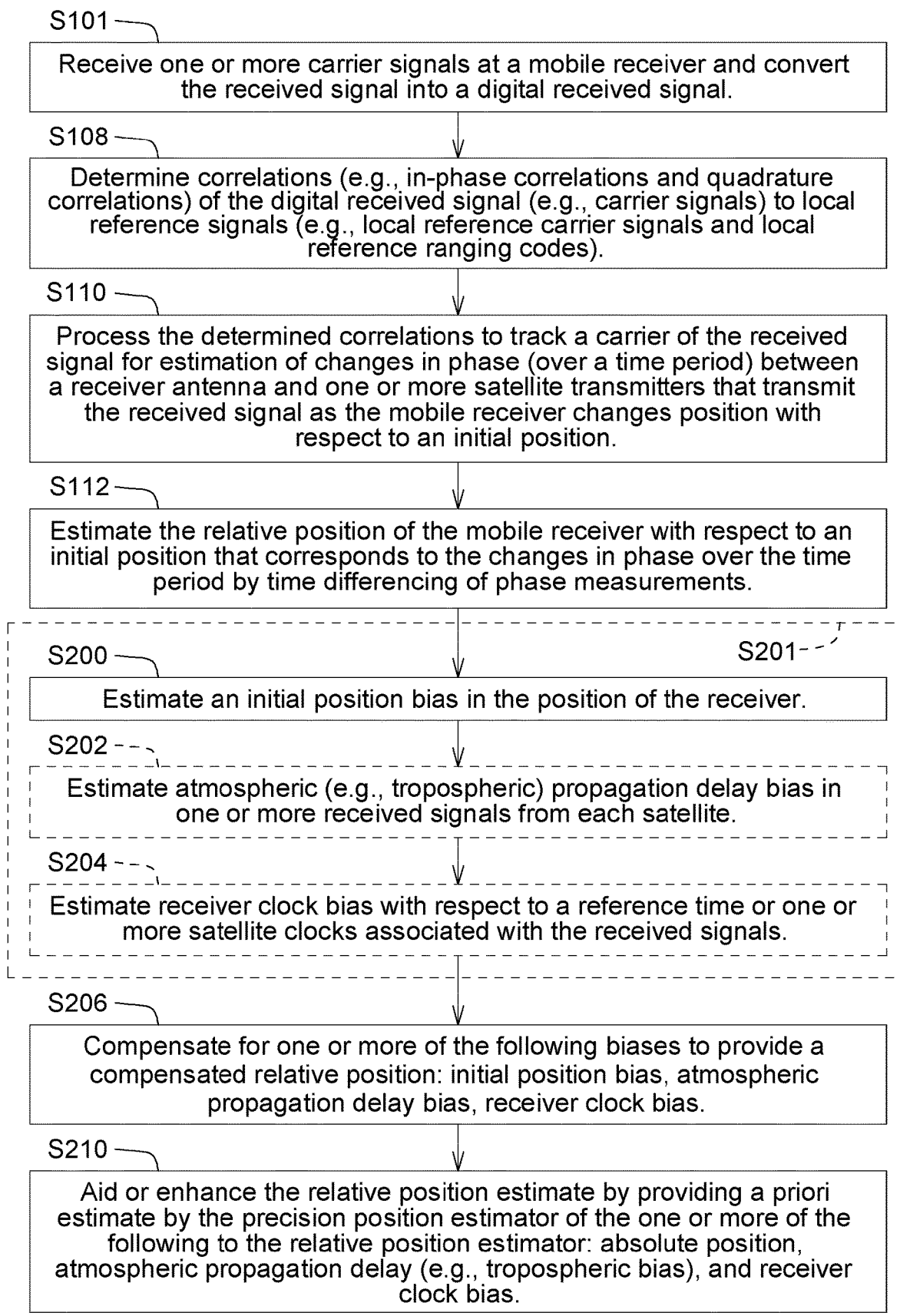
FIG. 6 is a flow chart of a sixth embodiment of a method for operating a satellite receiver with bias estimation.

FIG. 6 is a flow chart of a sixth embodiment of a method for operating a satellite receiver with initial bias compensation. The method of FIG. 6 is similar to the method of FIG. 2A, except the method of FIG. 6 further comprises step S210. Like reference numbers in FIG. 2A and FIG. 6 indicate like steps, or procedures.

In step S210, the navigation positioning estimator 30 or the precise position estimator 38 aids or enhances the relative position estimate of the relative position estimator 32 by providing an a priori estimate or predefined estimate by the precision position estimator of one or more of the following to the relative position estimator 32: absolute position, atmospheric propagation delay (e.g., tropospheric bias), and receiver clock bias. For example, the precise position estimator 38, controller 40, or navigation positioning estimator 30 can provide a priori estimate or predefined estimates, or bias-related data to the initial position bias estimator 34, the atmospheric bias estimator 36, or the receiver clock bias estimator 27.

Step S210 may be carried out in accordance with various techniques, which may be applied separately or cumulatively. Under a first technique, a precise position estimator 38 or a navigation positioning estimator 30 provides predefined or a priori estimates of one or more of the following: absolute position ($x_{ref,t}$), atmospheric delay bias or tropospheric delay bias ($T_{ref,t}$), receiver clock delay bias ($d\tau_{ref,t}$) to aid in determining a relative position estimate or compensated relative position estimate of the relative position estimator 32.

Under second technique, a precise position estimator 38 or a navigation positioning estimator 30 utilizes constraints or constraint measurements that tie the relative position estimator 32 to the precision position estimator over time so that with a given error variance $x_{bias,t0}+\Delta \hat{x}_{t,t0} \approx 0$. In one embodiment, the measurement-domain relationship between the residual of the time differenced phase equation of the relative position (e.g., Equation 1) and the absolute position can be expressed as $\Delta \hat{\varphi}_{t,t0}^i = \Delta \widetilde{\varphi}_{t,t0}^i + e_t^{iT} \Delta x_{ref,t,t0}$.

Figure 7:
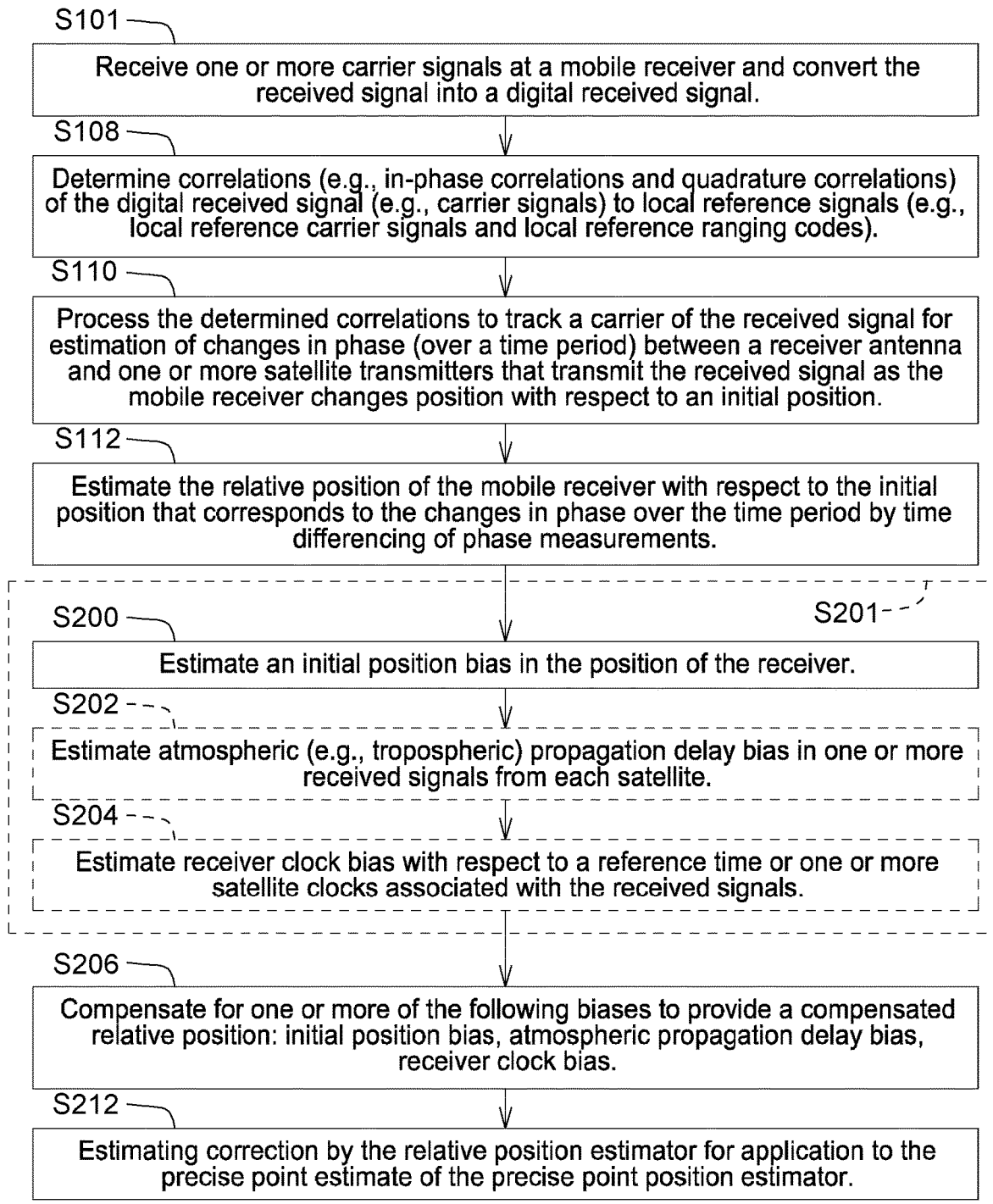
FIG. 7 is a flow chart of a seventh embodiment of a method for operating a satellite receiver with bias estimation.

FIG. 7 is a flow chart of a sixth embodiment of a method for operating a satellite receiver with initial bias compensation. The method of FIG. 7 is similar to the method of FIG. 2A, except the method of FIG. 7 further comprises step S212. Like reference numbers in FIG. 2A and FIG. 7 indicate like steps, or procedures.

In step S212, the navigation positioning estimator 30 or the relative position estimator 32 estimates a correction for application to the precise point estimate of the precise position estimator 38. For example, the controller 40 may correct the precise point estimate with the correction from the relative position estimator 32 where the precise position estimator 38 has not yet converged on a position solution by resolution of an integer ambiguity in the carrier phase, or where the position quality evaluator 42 determines that the precise point estimate is inconsistent with the relative position estimate of the relative position estimator 34 from an initial time t0 to the observation time t.

In an alternate embodiment that may optionally supplement or augment any other embodiment set forth in this document, a tracking module 25 or code tracking module 22 for tracking code of the received carrier signals estimates a change in code phase or a pseudo range between a receiver antenna and satellite transmitter for each satellite that transmits the received signal as the receiver changes its position over time. In the alternate embodiment, the relative position estimator 32 using the observed change in pseudo range to estimate a change in position of the receiver or using the change in position based on carrier phase. Because the carrier phase provides a more precise estimate, the relative position estimator 32 or the navigation positioning engine may use code phase to facilitate a search for an integer ambiguity solution of the carrier phase for the precise position point estimator 38, or to provide additional information on bias estimation, such as the receiver clock bias or atmospheric bias estimator 36 or estimation of the atmospheric bias terms $T_t$ and $T_{t0}$:

$$\Delta \tilde{\rho}_{t,t0}^i = -e_t^{iT} \Delta x_{t,t0} - \Delta e_{t,t0}^{iT} x_{t0} + \Delta \widetilde{d\tau}_{t,t0} + M_t^i T_t - M_{t0}^i T_{t0} + \Delta \varepsilon_{\tilde{\rho},t,t0}^i$$

$\Delta \tilde{\rho}_{t,t0}^i$ is a time-difference of ranging code phase measurements or observations between the mobile receiver and the satellite transmitter of satellite i at times t and t0 (t>t0);

$e_t^{iT}$ is the transpose of the receiver to satellite line-of-site vector;

$\Delta e_{t,t0}^{iT}$ is the change in the transpose of the receiver to satellite line of site vector from the initial time t0 the observation time, t;

$\Delta x_{t,t0}$ is the change in relative position from the initial time, t0, to the observation time, t;

$x_{t0}$ represents the position at time t0, which is a constant;

$\Delta \widetilde{d\tau}_{t,t0}$ is difference in receiver clock error at times t and t0;

$M_t^i$ is the so-called elevation wet mapping function at time t that maps zenith tropospheric delay to a line-of-sight delay between the mobile receiver and the satellite i;

$T_t$ is the residual zenith tropospheric delay at time t;

$M_{t0}^i$ is the so-called elevation wet mapping function at time t0 that maps zenith tropospheric delay to a line-of-sight delay between the mobile receiver and the satellite i;

$T_{t0}$ is the residual zenith tropospheric delay at t0; and $\Delta\varepsilon_{\tilde{\rho},t,t0}{}^i$ is the difference in ranging code phase observation noise and other unmodeled errors between times t and t0.

In one embodiment, the navigation positioning estimator 32 or the position quality evaluator 42 may use measurement editing to eliminate erroneous or outlying carrier phase measurements. In practice, erroneous carrier phase, pseudorange, constraint or other augmentation measurements might be erroneous. In order to minimize the impact of such outliers, one can include residual editing techniques well known to those versed in the art of navigation and estimation theory.

The system and method described in this document can be implemented efficiently with a simultaneous use of an existing PPP estimator 38. For example, many of the calculated or estimated values or states of the PPP estimator 38 can be re-used by the relative position estimator 32 to make the implementation of the described estimator quite efficient with scant overhead or additional data processing throughput. Moreover, it is possible to export this data in a communication message and practice the relative position estimator 32 outside of the receiver (11, 111) in a separate server, computer or data processing system.

In one embodiment, the method and system uses PPP clock and orbit error corrections on the carrier phase measurements, allows for rising/setting satellites, and supports proper handling of cycle slips to enable operation of the relative position estimator on arbitrarily long time periods with no long initialization period typically associated with PPP estimators.

Having described the preferred embodiment, it will become apparent that various modifications can be made without departing from the scope of the invention as defined in the accompanying claims.

The following is claimed:

1. A mobile satellite navigation receiver comprising:
a receiver antenna;
a receiver module coupled to an electronic data processing system, the receiver module for receiving a set of carrier signals from satellite transmitters;
a measurement module to determine correlations of each carrier signal in the set to a local reference carrier signal, the measurement module for observing carrier phase measurements of the carrier signals;
a tracking module of the measurement module to process the determined correlations to track the carrier signals for estimation of respective changes in the phase measurements over time between the receiver antenna, of the satellite navigation receiver, and the satellite transmitters that transmit the carrier signals as the satellite navigation receiver changes position with respect to an initial position of the satellite navigation receiver;
a relative position estimator configured to estimate a relative position, a receiver clock bias of the satellite navigation receiver with respect to a reference time, and an atmospheric propagation delay bias of the satellite navigation receiver with respect to the initial position by time-differencing of the phase measurements of the tracked carrier signals for each satellite from an initial time t0 an observation time and by determining a product of a change in the relative position from the initial time t0 the observation time and a transpose of the receiver to satellite line-of-site vector for each satellite, where the relative position is estimated independently of convergence of any precise position estimate;
a cycle slip detector for detecting a cycle slip in the tracking of the received carrier signals, where the cycle slip detector is configured to eliminate or remove respective phase measurements associated with the cycle slip or to eliminate or remove the respective phase measurements of a particular satellite associated with the cycle slip;
the relative position estimator configured to model or to estimate an initial position bias in the initial position of the satellite navigation receiver, the receiver clock bias with respect to the reference time, and the atmospheric propagation delay bias between the satellite navigation receiver and a respective satellite, the relative position estimator comprising a relative position continuity module to support a relative position estimation framework that allows relative navigation over a time interval exceeding multiple epochs or an arbitrarily long time interval by establishing a series of chained relative position vectors from a next initial position that is established or coextensive with a last known relative position of the relative position estimator prior to detection of the cycle slip or an appearance of a new satellite;
the relative position estimator adapted to compensate for the biases to provide a compensated relative position of the satellite navigation receiver with respect to the initial position.

2. The receiver according to claim 1 wherein the carrier phase measurements of each satellite are adjusted by a chaining correction factor based on an estimated position change vector that is dot-product multiplied by the transpose of the receiver to a respective satellite line-of-sight vector for a corresponding satellite.

3. The receiver according to claim 1 wherein:
the relative position estimator or the relative position continuity module comprises a software instructions configured to update the reference initial position $x_{ref,t0}$ to a new reference initial position $\bar{x}_{ref,t0'}$ at time $t0'>t0$ such that $$\bar{x}_{ref,t0'} \stackrel{def}{=} x_{ref,t0} + \Delta x_{t0',t0},$$

where time t0' is a transition time associated with the last known relative position for the series of a chained relative position vectors, where $x_{ref,t0}$ is the reference initial position at time t0, and where $\Delta x_{t0'}$, to, is the position change from time t0 to time t0';
the relative position estimator adjusts an observation equation of the carrier phase measurements of each satellite to account for changes in the reference initial position at time t0 by subtracting an updated vector dot product of the change in an estimated relative position from time t0 to time t0' and a transpose of the receiver to satellite line-of-site vector, which is represented as $-e_t^i \Delta\hat{x}_{t0',t0}$, inclusive of said subtraction, from the carrier phase measurements such that the initial position bias at t0, $x_{bias,t0}$, retains its original meaning in subsequent relative position vectors after the initial relative position vector associated with the reference initial position; and
the relative position estimator can subsequently recover the estimated relative position as $\hat{x}_t = \bar{x}_{ref,t0'} + \Delta\hat{x}_{t,t0'}$, where $\hat{x}_t$ is the estimated relative position at time t, where $\bar{x}_{ref,t0'}$ is the measured initial position at time t0', where $\Delta\hat{x}_{t,t0'}$ is the estimated position change or relative position vector from time t0' to time t, where $e_t^{iT}$ is a transpose of the receiver to satellite line-of-sight vector.

4. A mobile satellite navigation receiver comprising: a receiver antenna;
a receiver module coupled to an electronic data processing system, the receiver module for receiving a set of carrier signals from satellite transmitters;
a measurement module to determine correlations of each carrier signal in the set to a local reference carrier signal, the measurement module for observing carrier phase measurements of the carrier signals;
a tracking module of the measurement module to process the determined correlations to track the carrier signals for estimation of respective changes in the phase measurements over time between the receiver antenna, of the satellite navigation receiver, and the satellite transmitters that transmit the carrier signals as the satellite navigation receiver changes position with respect to an initial position of the satellite navigation receiver;
a relative position estimator configured to estimate a relative position, a receiver clock bias of the satellite navigation receiver with respect to a reference time, and an atmospheric propagation delay bias of the satellite navigation receiver with respect to the initial position by time-differencing of the phase measurements of the tracked carrier signals for each satellite from an initial time t0 an observation time and by determining a product of a change in the relative position from the initial time t0 the observation time and a transpose of the receiver to satellite line-of-site vector for each satellite, where the relative position is estimated independently of convergence of any precise position estimate;
the relative position estimator configured to model or to estimate an initial position bias in the initial position of the satellite navigation receiver, the receiver clock bias with respect to the reference time, and the atmospheric propagation delay bias between the satellite navigation receiver and a respective satellite;
the relative position estimator adapted to compensate for the biases to provide a compensated relative position of the satellite navigation receiver with respect to the initial position; and
a precise position estimator configured to provide predefined or a priori estimates of one or more of the following: an absolute position ($x_{ref,t}$) of the satellite navigation receiver, an atmospheric propagation delay bias or tropospheric delay bias ($T_{ref,t}$), the receiver clock bias ($d\tau_{ref,t}$) to aid in accurately determining a relative position estimate or compensated relative position estimate of the relative position estimator.

5. The receiver according to claim 4 comprising:
the precise position estimator configured to utilize constraints or constraint measurements that tie the relative position estimator to the precision position estimator over time so that with a given error variance: $x_{bias,t0} + \Delta\hat{x}_{t,t0} \approx 0$, where:
$\Delta\hat{x}_{t,t0}$ is the change in reference trajectory position offset from the initial time, t0, to the observation time, t, and
$x_{bias,t0}$ is the initial position bias at the initial time, t0.

6. The receiver according to claim 4 comprising:
the precise position estimator configured to utilize constraint measurements that tie the relative position estimate of tropospheric delay to that of the precise position estimator so that with a given error variance: $T_t - T_{ref,t} \approx 0$, where:

$T_t$ is zenith tropospheric delay, and
$T_{ref,t}$ is bias-related data on the atmospheric delay.

7. A mobile satellite navigation receiver comprising:
a receiver antenna;
a receiver module coupled to an electronic data processing system, the receiver module configured for receiving a set of carrier signals from satellite transmitters;
a measurement module to determine correlations of each carrier signal in the set to a local reference carrier signal, the measurement module for observing carrier phase measurements of the carrier signals;
a tracking module of the measurement module to process the determined correlations to track the carrier signals for estimation of respective changes in the phase measurements over time between the receiver antenna, of the satellite navigation receiver, and the satellite transmitters that transmit the carrier signals as the satellite navigation receiver changes position with respect to an initial position of the satellite navigation receiver;
a relative position estimator configured to estimate a relative position, a receiver clock bias of the satellite navigation receiver with respect to a reference time, and an atmospheric propagation delay bias of the satellite navigation receiver with respect to the initial position by time-differencing of the phase measurements of the tracked carrier signals for each satellite from an initial time t0 an observation time and by determining a product of a change in the relative position from the initial time t0 the observation time and a transpose of the receiver to satellite line-of-site vector for each satellite, where the relative position is estimated independently of convergence of any precise position estimate;
the relative position estimator configured to model or to estimate an initial position bias in the initial position of the satellite navigation receiver, the receiver clock bias with respect to the reference time, and the atmospheric propagation delay bias between the satellite navigation receiver and a respective satellite;
the relative position estimator adapted to compensate for the biases to provide a compensated relative position of the satellite navigation receiver with respect to the initial position; and
a precise position estimator for determining a precise position estimate based on carrier phase measurements of the received carrier signal §, the precise position estimator running simultaneously with the relative position estimator, the precise position estimator determining a reference trajectory of the receiver, the reference trajectory representing a defined target path or reference position vector of the receiver or a heading/yaw that is consistent with a time series of reference points indicative of the past and current positions of the receiver;
the relative position estimator adapted to determine a correction or offsets to position estimates provided by the precise position estimator in accordance with the following equations, where the position estimates comprise relative position estimates or absolute position estimates:

$\hat{x}_t = x_{ref,t0} + \Delta x_{ref,t,t0} + \Delta\hat{x}_{t,t0}$ or $x_t = \hat{x}_t + x_{bias,t0}$;

and $\Delta\hat{\varphi}_{t,t0}^i = -e_t^{iT}\Delta\hat{x}_{t,t0} - \Delta e_{t,t0}^{iT}x_{bias,t0} + \Delta\widetilde{d\tau}_{t,t0} + M_t^i T_t - M_{t0}^i T_{t0} + \Delta\varepsilon_{\hat{\varphi},t,t0}^i$; where:

$\hat{x}_t$ is the estimated relative position vector from time 0 to t;

$x_t$ is the estimated absolute position at time t;

$x_{ref,t0}$ is the measured initial position at time t0;

$\Delta x_{ref,t,t0}$ is the estimated change in reference position from time t0 to time t;

$\Delta x_{t,t0}$, is the absolute position change from time t0 to time t;

$\Delta \hat{x}_{t,t0}$ is the change in reference trajectory position offset from the initial time, t0, to the observation time, t;

$\Delta \hat{x}_{t,t0}$ is a correction to the relative position with respect to the reference trajectory of the precise position estimator, $\Delta x_{t,t0} = \Delta x_{ref,t,t0} + \Delta \hat{x}_{t,t0}$;

$\Delta \hat{\varphi}_{t,t0}^{i}$ is a time-difference of carrier phase measurements or observations between the mobile receiver and the satellite transmitter of satellite i at times t and to (t>t0) along the reference trajectory;

$e_t^i$ is the receiver to satellite line-of-sight vector;

$e_t^{iT}$ is the transpose of the receiver to satellite line-of-sight vector;

$\Delta e_{t,t0}^{i}$ is the transpose in the change in the receiver to satellite line-of-site vector between time t and t0;

T is a residual zenith tropospheric delay constant or time-varying function;

$\Delta \widetilde{d\tau}_{t,t0}$ is the difference in receiver clock error at times t and t0;

$M_t^i$ is the elevation mapping function at time t that maps zenith tropospheric delay to a line-of-sight delay between the mobile receiver and the satellite i;

$T_t$ is the residual zenith tropospheric delay at time t;

$M_{t0}^i$ is the mapping function at time t0;

$T_{t0}$ is the residual zenith tropospheric delay at t0; and $\Delta \varepsilon_{\hat{\varphi},t,t0}^{i}$ is the difference in carrier-phase observation noise and other unmodeled errors between times t and t0 along the reference trajectory.

8. The receiver according to claim 1 in which the relative position estimator comprises a predictive filter for modeling or estimating the initial position bias in the initial position of the satellite navigation receiver, the receiver clock bias with respect to the reference time, and the atmospheric propagation delay bias between the satellite navigation receiver and each respective satellite.

9. The receiver according to claim 4 in which the relative position estimator comprises a predictive filter for modeling or estimating the initial position bias in the initial position of the satellite navigation receiver, the receiver clock bias with respect to the reference time, and the atmospheric propagation delay bias between the satellite navigation receiver and each respective satellite.

10. The receiver according to claim 7 in which the relative position estimator comprises a predictive filter for modeling or estimating the initial position bias in the initial position of the satellite navigation receiver, the receiver clock bias with respect to the reference time, and the atmospheric propagation delay bias between the satellite navigation receiver and each respective satellite.

11. The receiver according to claim 1 wherein the cycle slip detector is coupled to the carrier tracking module.

12. The receiver according to claim 4 wherein the precise position estimator comprises a precise point position (PPP) estimator, including a wide area differential global navigation satellite system (GNSS) position estimator, where the precise position estimator is capable of receiving correction data from a correction wireless device.

13. The receiver according to claim 1 wherein the receiver comprises a data storage device for storing the modules and wherein an electronic data processor is configured to execute software instructions within the modules.

14. The receiver according to claim 4 wherein the receiver comprises a data storage device for storing the modules and wherein an electronic data processor is configured to execute software instructions within the modules.

15. The receiver according to claim 7 wherein the receiver comprises a data storage device for storing the modules and wherein an electronic data processor is configured to execute software instructions within the modules.

* * * * *